(12) United States Patent
Kozuki

(10) Patent No.: US 9,857,464 B2
(45) Date of Patent: Jan. 2, 2018

(54) DEVICE, METHOD AND PROGRAM FOR PROCESSING SIGNAL, UNDERWATER DETECTING DEVICE AND RADAR APPARATUS

(71) Applicant: Furuno Electric Co., Ltd., Nishinomiya (JP)

(72) Inventor: Kohei Kozuki, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 239 days.

(21) Appl. No.: 14/750,892

(22) Filed: Jun. 25, 2015

(65) Prior Publication Data

US 2016/0003942 A1 Jan. 7, 2016

(30) Foreign Application Priority Data

Jul. 1, 2014 (JP) .................................. 2014-136062

(51) Int. Cl.
*G01S 15/06* (2006.01)
*G01S 15/96* (2006.01)
(Continued)

(52) U.S. Cl.
CPC ............ *G01S 15/06* (2013.01); *G01S 3/8006* (2013.01); *G01S 7/292* (2013.01); *G01S 7/527* (2013.01);
(Continued)

(58) Field of Classification Search
CPC ........ G01S 15/06; G01S 15/96; G01S 3/8006; G01S 7/292; G01S 15/89; G01S 15/10;
(Continued)

(56) References Cited

U.S. PATENT DOCUMENTS

2004/0130442 A1* 7/2004 Breed ..................... B60C 11/24
340/443
2004/0135992 A1* 7/2004 Munro .................... G01S 17/10
356/4.01
(Continued)

FOREIGN PATENT DOCUMENTS

GB 2456426 A 7/2009
GB 2485492 B 8/2012
(Continued)

OTHER PUBLICATIONS

Sakurai, K. et al., "Study of Multi-path Propagation by Antenna Pattern Analysis," Institute of Electronics, Information and Communication Engineers (IEICE) Technical Report: Antennas and Propagation, vol. 77, No. 101, Jun. 1977, 6 pages. (See background of Specification submitted herewith for English explanation of relevance).
(Continued)

*Primary Examiner* — Luke D Ratcliffe
*Assistant Examiner* — Amie M Ndure
(74) *Attorney, Agent, or Firm* — Alleman Hall Creasman & Tuttle LLP

(57) ABSTRACT

A signal processor for processing target echo signal is provided. The signal processor includes a filter configured to generate a filtered echo signal by extracting echo signal components within a predetermined frequency band from the target echo signal, a high resolution signal generator configured to generate a high resolution signal based on the target echo signal, and a synthesizing module configured to synthesize the filtered echo signal with the high resolution signal. The high resolution signal has higher resolution than the filtered echo signal.

14 Claims, 26 Drawing Sheets

(51) Int. Cl.

| | | |
|---|---|---|
| *G01S 3/80* | (2006.01) | |
| *G01S 7/292* | (2006.01) | |
| *G01S 7/527* | (2006.01) | |
| *G01S 15/10* | (2006.01) | |
| *G01S 15/89* | (2006.01) | |
| *H04B 11/00* | (2006.01) | |
| *G01S 7/539* | (2006.01) | |
| *G01S 13/28* | (2006.01) | |
| *G01S 13/93* | (2006.01) | |

(52) U.S. Cl.
CPC .............. *G01S 15/10* (2013.01); *G01S 15/89* (2013.01); *G01S 15/96* (2013.01); *H04B 11/00* (2013.01); *G01S 7/539* (2013.01); *G01S 13/28* (2013.01); *G01S 13/9307* (2013.01)

(58) Field of Classification Search
CPC .......... G01S 7/527; G01S 7/539; G01S 13/28; G01S 13/93; H04B 11/00
USPC .......................................................... 367/87
See application file for complete search history.

(56) References Cited

U.S. PATENT DOCUMENTS

| | | | | |
|---|---|---|---|---|
| 2005/0031016 | A1* | 2/2005 | Rosen ..................... | H04B 1/713 375/130 |
| 2005/0031051 | A1* | 2/2005 | Rosen ..................... | H04B 1/713 375/295 |
| 2005/0226312 | A1* | 10/2005 | Koslar ..................... | H04B 1/69 375/142 |
| 2006/0132370 | A1* | 6/2006 | Tietjen ..................... | G01S 7/03 343/757 |
| 2006/0133210 | A1* | 6/2006 | Ishihara ................... | G01S 7/527 367/99 |
| 2006/0287596 | A1* | 12/2006 | Johnson ................ | A61B 5/4312 600/437 |
| 2008/0100503 | A1* | 5/2008 | Yanagi .................... | G01S 7/064 342/176 |
| 2008/0112265 | A1* | 5/2008 | Urbano ............... | G01S 7/52096 367/87 |
| 2008/0114245 | A1* | 5/2008 | Randall ................... | A61B 8/42 600/447 |
| 2009/0174931 | A1* | 7/2009 | Huber ................ | H01S 3/06791 359/340 |
| 2009/0224962 | A1* | 9/2009 | Pao ........................... | G01S 3/74 342/179 |
| 2012/0263018 | A1* | 10/2012 | Yamaguchi ............. | G01S 7/524 367/88 |
| 2013/0307720 | A1 | 11/2013 | Lilburn | |

FOREIGN PATENT DOCUMENTS

| | | |
|---|---|---|
| JP | 3032186 B2 | 4/2000 |
| JP | 3160580 B2 | 4/2001 |
| JP | 3160581 B2 | 4/2001 |
| JP | 2010183979 A | 8/2010 |
| WO | 2010100868 A1 | 9/2010 |
| WO | WO 2012153479 * 1/2013 ......... G01S 7/52047 |

OTHER PUBLICATIONS

Anzai, M. et al., "Direction-of-Arrival Estimation of Indoor Multipath Waves by Rotatory Scanning of Antenna Using Music Algorithm," Institute of Electronics, Information and Communication Engineers (IEICE) Technical Report: Electromagnetic Compatibility, vol. 89, No. 349, May 1989, 6 pages. (See background of Specification submitted herewith for English explanation of relevance).

Kikuma, N. "Adaptive Signal Processing by Array Antenna," Chapter 13, Published by Kagaku Gijutsu Shuppan, Nov. 1998, 13 pages. (See background of Specification submitted herewith for English explanation of relevance).

Kimura, T. et al., "Experimental Study of High-Range-Resolution Medical Acoustic Imaging for Multiple Target Detection by Frequency Domain Interferometry," Japanese Journal of Applied Physics, vol. 48, No. 7S, Jul. 2009, 4 pages.

Taki, H. et al., "High Range Resolution Ultrasonographic Vascular Imaging Using Frequency Domain Interferometry with the Capon Method," IEEE Transactions on Medical Imaging, vol. 31, No. 2, Feb. 2012, 13 pages.

European Patent Office, Extended European Search Report Issued in Application No. 15174237.6, dated Nov. 26, 2015, Germany, 9 pages.

Synnevag, J.F. et al., "A Low-Complexity Data-Dependent Beamformer," IEEE Transactions on Ultrasonics, Ferroelectrics, and Frequency Control, vol. 57, No. 2, Feb. 2010, 9 pages.

Blomberg, A. et al., "Improving Sonar Performance in Shallow Water Using Adaptive Beamforming," IEEE Journal of Oceanic Engineering, vol. 38, No. 2, Apr. 10, 2013, 11 pages.

* cited by examiner

DEVICE, METHOD AND PROGRAM FOR PROCESSING SIGNAL, UNDERWATER DETECTING DEVICE AND RADAR APPARATUS

CROSS-REFERENCE TO RELATED APPLICATION(S)

This application claims priority under 35 U.S.C. §119 to Japanese Patent Application No. 2014-136062, which was filed on Jul. 1, 2014, the entire disclosure of which is hereby incorporated by reference.

TECHNICAL FIELD

This disclosure generally relates to a device, method and program for processing signal, an underwater detecting device, and a radar apparatus, in which an intensity spectrum of a reception signal is estimated.

BACKGROUND OF THE INVENTION

Generally, an azimuth resolution of detecting devices (e.g., radar apparatuses) is dependent on a beam width, and the beam width is defined by an aperture length of an antenna. Specifically, the azimuth resolution is defined by the aperture length of the antenna, and the azimuth resolution can be improved by extending the aperture length of the antenna. However, if the aperture length of the antenna is extended to improve the azimuth resolution, the size of the radar apparatus will become large. Therefore, it is requested to improve the azimuth resolution without extending the aperture length of the antenna. Also a range resolution (temporal resolution) of radar apparatuses is defined by a frequency bandwidth of the system and can be improved by extending the frequency bandwidth of the system. However, extending the frequency bandwidth of the system is technically difficult and also leads to a cost increase; therefore, it is requested to improve the range resolution without extending the frequency bandwidth.

To improve the azimuth resolution without extending the aperture length of the antenna and improve the range resolution without extending the frequency bandwidth, a method is known to perform inverse filtering on a reception signal. For example, JP3160580B discloses an art for improving the azimuth resolution by performing the inverse filtering. Specifically, first, a reception radio wave received by an antenna is converted into a reception electric field signal by a reception circuit, and the electric field signal is Fourier-transformed by a Fourier transformer. Next, the Fourier-transformed electric field signal is divided by a Fourier-transformed antenna pattern. After such inverse filtering, inverse Fourier transform is performed on the electric field signal, and this signal is outputted. By performing the inverse filtering as above, the azimuth resolution can be improved. The range resolution can also be improved in a similar manner.

Moreover, as the processing performed after the inverse filtering, other methods using so-called super-resolution methods, such as the Capon method, the MUSIC method and the Prony method, are also proposed instead of the inverse Fourier transform, so as to improve the azimuth resolution or the range resolution even more (see JP3032186B, JP2010-183979A, JP3160581B, "Study of Multi-path Propagation by Antenna Pattern Analysis" by Keiichi Sakurai, Kazuaki Takao and Iwane Kimura in The Institute of Electronics, Information and Communication Engineers (IEICE) Technical Report (Antennas and Propagation), Vol. 77, No. 101, pp. 1-6 (1977), "Direction-of-Arrival Estimation of Indoor Multipath Waves by Rotatory Scanning of Antenna using MUSIC algorithm" by Makoto Anzai, Masaru Ogawa, Koichi Yamada, Nobuyoshi Kikuma and Naoki Inagaki in IEICE Technical Report (Electromagnetic Compatibility), Vol. 89, No. 349, pp. 7-12 (1989), Chapter 13 of "Adaptive Signal Processing by Array Antenna" by Nobuyoshi Kikuma published by Kagaku Gijutsu Shuppan (2004), and "Experimental Study of High-Range-Resolution Medical Acoustic Imaging for Multiple Target Detection by Frequency Domain Interferometry" by Tomoki Kimura, Hirofumi Taki, Takuya Sakamoto and Toni Sato in Japanese Journal of Applied Physics 48 (2009)).

Furthermore, "High Range Resolution Ultrasonographic Vascular Imaging Using Frequency Domain Interferometry with the Capon Method" (IEEE Transactions on medical imaging, Vol. 31, No. 2, February 2012) discloses an art for reducing a false image generated in an echo image due to using any of the super-resolution methods described above, by using a moving average.

However, if the false image is reduced by using the moving average as described above, a part of the echo image where the false image is not generated may also be influenced by the false image.

SUMMARY OF THE INVENTION

The purpose of this disclosure relates to reducing a false image while maintaining a resolution of an echo image component generated based on an echo signal from a target object.

According to one aspect of this disclosure, a signal processor for processing target echo signal is provided. The signal processor includes a filter configured to generate a filtered echo signal by extracting echo signal components within a predetermined frequency band from the target echo signal, a high resolution signal generator configured to generate a high resolution signal based on the target echo signal, the high resolution signal having higher resolution than the filtered echo signal, and a synthesizing module configured to synthesize the filtered echo signal with the high resolution signal.

The synthesizing module preferably synthesizes the filtered echo signal with the high resolution signal based on an intensity of the filtered echo signal and an intensity of the high resolution signal.

The synthesizing module preferably synthesizes the filtered echo signal with the high resolution signal based on an intensity of a first sample sampled from the high resolution signal and an intensity of a second sample sampled from the filtered echo signal, said first and second samples being corresponding samples.

The synthesizing module preferably synthesizes the filtered echo signal with the high resolution signal by selecting a sample with a lowest intensity between the first and second samples.

The synthesizing module preferably synthesizes the filtered echo signal with the high resolution signal by adding a value obtained by multiplying the first sample by a first coefficient to a value obtained by multiplying the second sample by a second coefficient.

The synthesizing module preferably selects one of the first sample and the second sample based on a comparison between the intensities of the first and second samples.

The target echo signal is preferably generated based on a reflection wave caused by a transmission wave transmitted from a transmitter and reflected on a target object. The synthesizing module preferably includes a zone discriminator configured to partition a distance range into a first zone where the intensity of the first sample is the same as or higher than the intensity of the second sample and a second zone where the intensity of the first sample is lower than the intensity of the second sample, said distance range corresponding to a time length from transmission of the transmission wave until reception of the reflection wave by a receiver. The synthesizing module preferably selects among a plurality of said first zones the first sample for a first zone having a length smaller than a predetermined threshold.

The target echo signal is preferably generated based on a reflection wave caused by a transmission wave transmitted from a transmitter and reflected on a target object. The synthesizing module preferably includes a zone discriminator configured to partition a distance range into a first zone where the intensity of the first sample is the same as or higher than the intensity of the second sample and a second zone where the intensity of the first sample is lower than the intensity of the second sample, said distance range corresponding to a time length from transmission of the transmission wave until reception of the reflection wave by a receiver. The synthesizing module preferably selects among a plurality of said first zones the first sample for a first zone when a first sample with a highest intensity among first samples within said first zone is at a position other than at a boundary of said first zone with the second zone adjacent thereto and when a maximum value among ratios between first and second corresponding samples within said first zone is lower than a predetermined threshold.

The high resolution signal generator preferably includes an inverse filter configured to perform inverse filtering of the target echo signal and an intensity spectrum calculator configured to calculate an intensity spectrum of the inverse-filtered target echo signal.

The high resolution signal generator preferably includes a pulse compressor configured to perform pulse compression of the target echo signal.

According to another aspect of this disclosure, an underwater detecting device is provided. The underwater detecting device includes a receiver configured to receive a target echo signal to be processed, the target echo signal being caused by an acoustic wave transmitted underwater, the signal processor in any one of the above descriptions, configured to process the target echo signal received by the receiver, and a display unit configured to display a synthesized signal generated by the synthesizing module of the signal processor.

The signal processor further preferably includes a water bottom detector configured to detect a depth position of a water bottom, and a synthesizing range specifying module configured to specify a target range within which the synthesizing module of the signal processor synthesizes the filtered echo signal with the high resolution signal, the target range being a predetermined depth range including the depth position of the water bottom detected by the water bottom detector.

According to further another aspect of this disclosure, a radar apparatus is provided. The radar apparatus includes an antenna configured to receive a target echo signal to be processed, the signal processor in any one of the above descriptions, configured to process the target echo signal received by the antenna, and a display unit configured to display a synthesized signal generated by the synthesizing module of the signal processor.

According to further another aspect of this disclosure, a method of processing target echo signal is provided. The method includes generating a filtered echo signal by extracting echo signal components within a predetermined frequency band from the target echo signal, generating a high resolution signal based on the target echo signal, the high resolution signal having higher resolution than the filtered echo signal, and synthesizing the filtered echo signal with the high resolution signal.

According to further another aspect of this disclosure, computer readable media configured to store a computer executable program in a non-transitory manner, which upon execution by a processor of a computer causes the computer to process target echo signal is provided. Processing the target echo signal includes causing a computer to generate a filtered echo signal by extracting echo signal components within a predetermined frequency band from the target echo signal, causing a computer to generate a high resolution signal based on the target echo signal, the high resolution signal having higher resolution than the filtered echo signal, and causing a computer to synthesize the filtered echo signal with the high resolution signal.

According to this disclosure, the false image can be reduced, while maintaining the resolution of the echo image component generated based on the echo signal from the target object.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
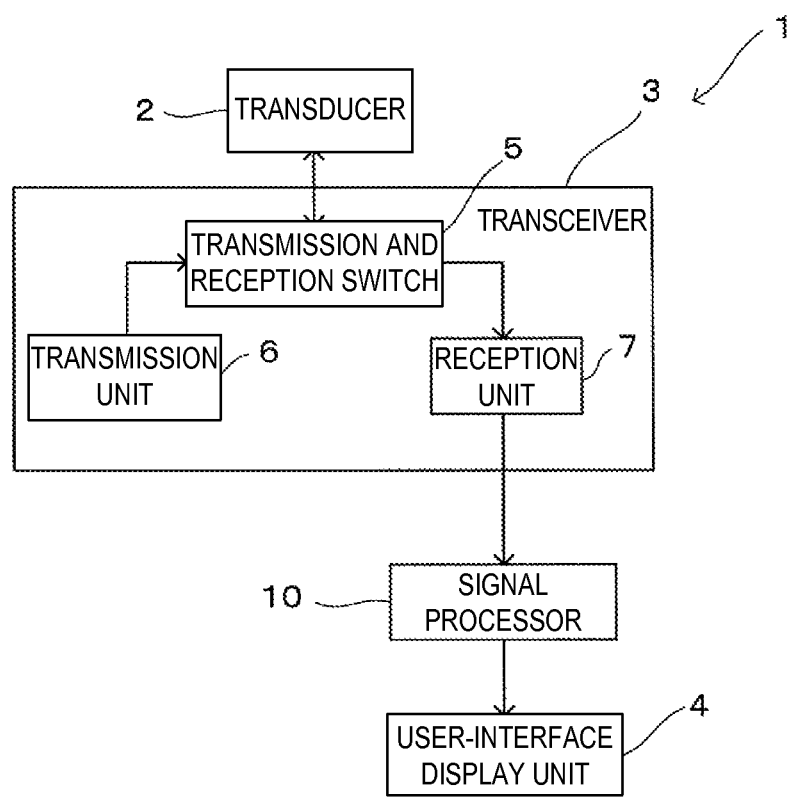
FIG. 1 is a block diagram illustrating a configuration of an underwater detecting device according to one embodiment of this disclosure.

Hereinafter, one embodiment of a signal processor and an underwater detecting device using the signal processor according to this disclosure is described with reference to the drawings. FIG. 1 is a block diagram illustrating a configuration of an underwater detecting device 1 according to this embodiment of this disclosure.

[Overall Configuration]

As illustrated in FIG. 1, the underwater detecting device 1 includes a transducer 2, a transceiver 3, a signal processor 10, and a user-interface display unit 4 (display unit). The underwater detecting device 1 is installed in a ship (hereinafter, may be referred to as "the ship concerned" or simply as "the ship"), such as a fishing boat, and mainly used for detecting a target object (e.g., a single fish or a school of fish).

The transducer 2 functions as both a transmitter configured to transmit an ultrasonic wave (transmission wave) and a receiver configured to receive an ultrasonic wave (reception wave). The transducer 2 converts an electric signal (transmission signal) into the transmission wave, transmits the transmission wave underwater at every predetermined timing, and converts the reception waves into electric signals (reception signals).

The transceiver 3 includes a transmission and reception switch 5, a transmission unit 6, and a reception unit 7. In transmission, the transmission and reception switch 5 switches the connection in the transceiver 3 such that each transmission signal is transmitted by the transmission unit 6 to the transducer 2. In reception, the transmission and reception switch 5 switches the connection in the transceiver 3 such that each electric signal converted from the reception wave by the transducer 2 is transmitted from the transducer 2 to the reception unit 7.

The transmission unit 6 outputs the transmission signal generated based on a condition set by the user-interface display unit 4, to the transducer 2 via the transmission and reception switch 5.

The reception unit 7 amplifies the signal received by the transducer 2 and A/D converts it into a digital signal (reception data). Then, the reception unit 7 outputs the digitally converted reception data (target echo signal) to the signal processor 10.

The signal processor 10 processes the reception data outputted by the reception unit 7 and performs processing for generating an image signal of the target object. The configuration of the signal processor 10 is described later in detail.

The user-interface display unit 4 displays on a display screen an image corresponding to the image signal outputted by the signal processor 10. An operator can estimate a situation of an underwater area below the ship (e.g., whether a single fish and/or a school of fish exist therein) by looking at the display screen. Moreover, the user-interface display unit 4 has an input unit with various input keys, etc. . . . so that various settings or various parameters required for the transmission and reception of the ultrasonic wave, the signal processing or the image display can be inputted therethrough.

[Configuration of Signal Processor]

Figure 2:
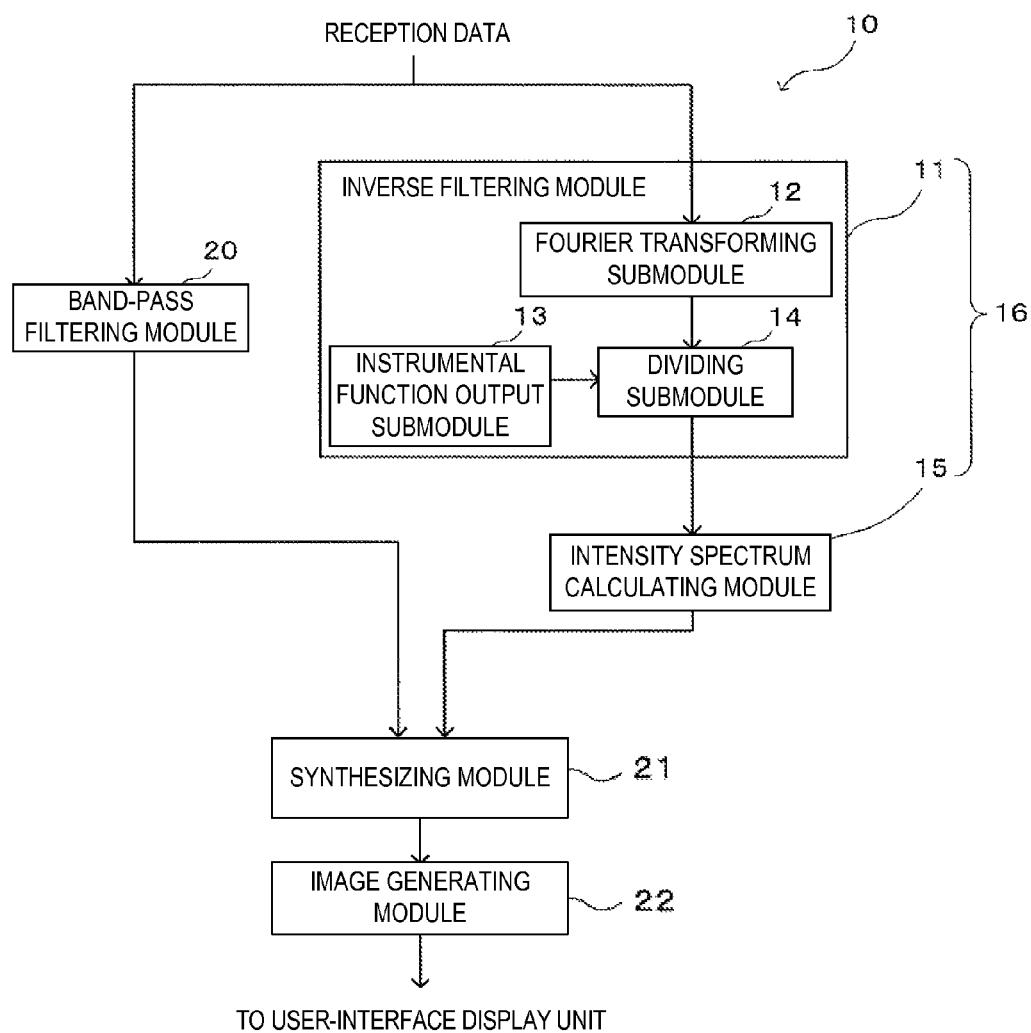
FIG. 2 is a block diagram illustrating a configuration of a signal processor of the underwater detecting device in FIG. 1.

FIG. 2 is a block diagram illustrating the configuration of the signal processor 10. As illustrated in FIG. 2, the signal processor 10 includes an inverse filtering module 11 (inverse filter), an intensity spectrum calculating module 15 (intensity spectrum calculator), a band-pass filtering module 20 (filtering module, filter), a synthesizing module 21, and an image generating module 22. The signal processor 10 is constituted with devices including for example a CPU, an FPGA, and a memory (not illustrated). For example, the CPU reads a signal processing program from a memory and executes it to perform the functions of the inverse filtering module 11, the intensity spectrum calculating module 15, the band-pass filtering module 20, the synthesizing module 21, and the image generating module 22.

The signal processing program causes the signal processor 10 to implement a signal processing method of one embodiment of this disclosure. The program may be installed from outside. Such a program acquired by installation is stored in a storage medium so as to be distributed. The hardware and software described above are configured to operate in cooperation with each other. Thus, the signal processor 10 can function as the inverse filtering module 11, the intensity spectrum calculating module 15, the band-pass filtering module 20, the synthesizing module 21, and the image generating module 22.

The inverse filtering module 11 performs inverse filtering so as to remove influence of an instrumental function of the transducer 2 from the reception data. As illustrated in FIG. 2, the inverse filtering module 11 includes a Fourier transforming submodule 12, an instrumental function output submodule 13, and a dividing submodule 14.

The Fourier transforming submodule 12 performs Fourier transform on the reception data outputted by the reception unit 7 and outputs it to the dividing submodule 14. When the number of samples of the reception data in a time direction (time samples) is M, the output of the Fourier transforming submodule 12 can be expressed as a complex vector $Y=[y_1, y_2, \ldots, y_M]^T$. Here, T indicates transposition. Note that, if a so-called zero padding is performed in the Fourier transform, the number of elements in the complex vector Y becomes larger than M; however, the number of elements in the complex vector Y of this embodiment is M which is the same as the number of the samples of reception data in the time direction.

The instrumental function output submodule 13 Fourier-transforms the instrumental function of the transducer 2. The instrumental function of the transducer 2 of this embodiment is a predetermined function determined based on the pulse wave transmitted by the transducer 2, and one example of the instrumental function is impulse response. This instrumental function is measured or modeled, and is stored in a memory, for example. The result obtained by Fourier-transforming the instrumental function as described above is expressed as a complex vector $H=[h_1, h_2, \ldots, h_M]^T$. Here, the number of elements in the output of the Fourier transforming submodule 12 is the same as that of the instrumental function output submodule 13. Note that, the result obtained by Fourier-transforming the instrumental function may be, for example, stored in a memory to be suitably read by the instrumental function output submodule 13.

The dividing submodule 14 divides the output Y from the Fourier transforming submodule 12 by the output H from the instrumental function output submodule 13 to obtain a complex vector X (=Y/H), and outputs the complex vector X to the intensity spectrum calculating module 15 as an inverse filtered signal. The above processing is the inverse filtering, and by this inverse filtering, the influence of the instrumental function can be removed from the reception data.

The intensity spectrum calculating module 15 processes the complex vector X (a signal corresponding to the reception data from which the influence of the instrumental function is already removed) outputted by the inverse filtering module 11, so as to calculate an intensity spectrum P(t) in every ping. Each intensity spectrum P(t) is outputted to the synthesizing module 21. Examples of the method of calculating the intensity spectrum P(t) include inverse Fourier transform and known methods referred to as the super-resolution methods (e.g., Capon method, MUSIC method and Prony method). Thus, the intensity spectrum calculating module 15 calculates in each ping a high resolution signal having high resolution in the time direction.

Note that, the inverse filtering module 11 and the intensity spectrum calculating module 15 described above are provided as a high resolution signal generating unit 16 (high resolution signal generator) configured to generate the high resolution signal of which temporal resolution is higher than that of a filtered echo signal generated by the band-pass filtering module 20 (described later). Moreover, the intensity spectrum P(t) which is calculated by the intensity spectrum calculating module 15 is calculated as the high resolution signal.

The band-pass filtering module 20 extracts reception data in a predetermined frequency band, from the reception data outputted by the reception unit 7. The reception data extracted by the band-pass filtering module 20 is outputted to the synthesizing module 21 as the filtered echo signal. Note that, in this embodiment, the filtering module configured to extract the reception data in the predetermined frequency band from all the reception data is configured as the band-pass filtering module; however, without limiting to this, other filtering module (e.g., a low-pass filtering module) may be adopted.

The synthesizing module 21 synthesizes each sample constituting the intensity spectrum P(t) (hereinafter, referred to as the first sample) with one of the samples of the filtered echo signal corresponding to the first sample (hereinafter, the sample corresponding to the first sample is referred to as the second sample). Specifically, the synthesizing module 21 compares the first sample of the intensity spectrum P(t) with the second sample at the same depth position and in the same ping as the first sample. If the intensity of the first sample is lower than that of the second sample, the synthesizing module 21 selects the first sample and outputs it to the image generating module 22 as the output sample. On the other hand, if the intensity of the first sample is the same as or higher than that of the second sample, the synthesizing module 21 selects the second sample and outputs it to the image generating module 22 as the output sample.

Figure 3:
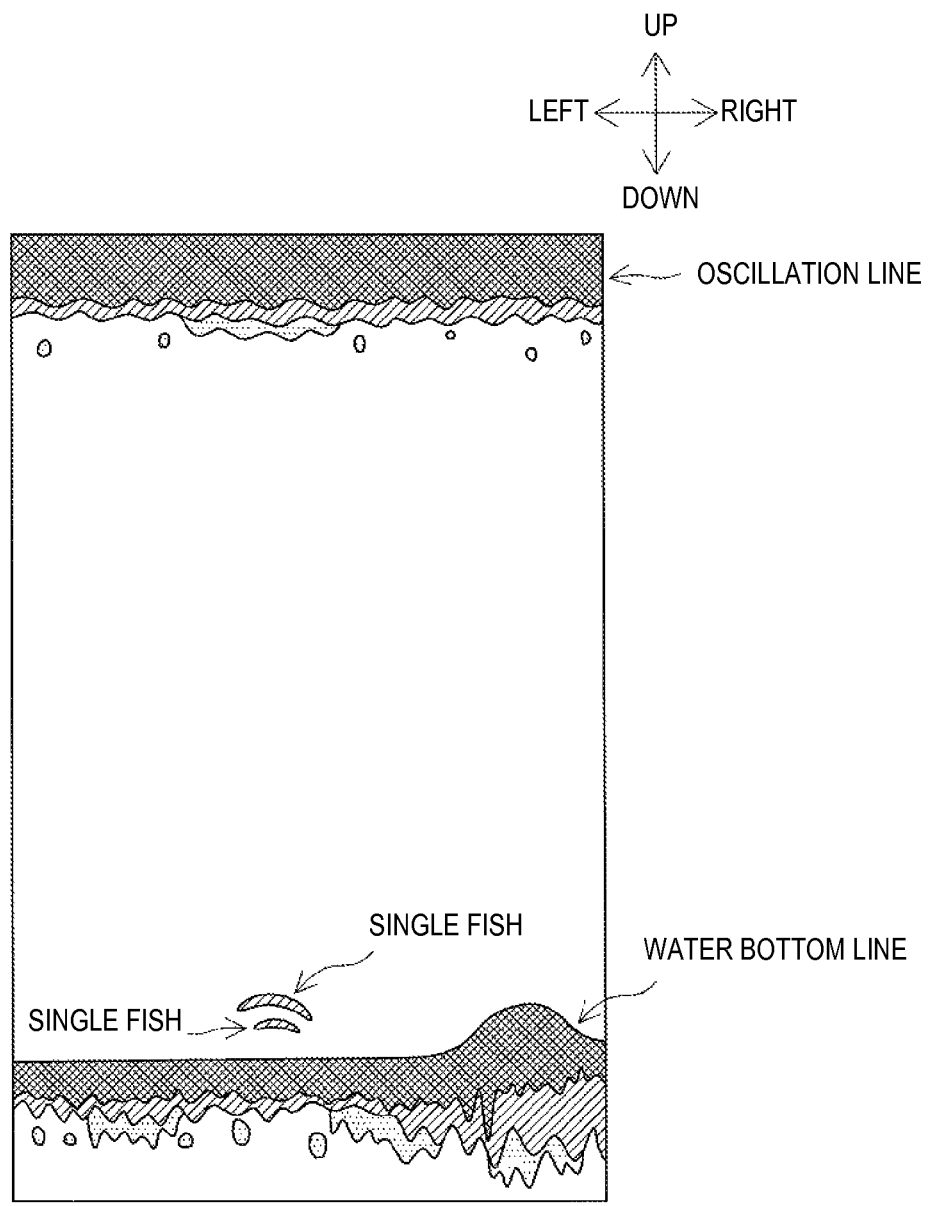
FIG. 3 is a view illustrating an example of an echo image displayed on a user-interface display unit.

FIG. 3 is a view illustrating an example of an echo image displayed on the user-interface display unit 4. The image generating module 22 generates the echo image based on the output samples outputted by the synthesizing module 21. In the echo image displayed on the user-interface display unit 4 of this embodiment, up/down direction corresponds to water depth, and left/right direction indicates pings each corresponding to the transmission time point of the pulse wave transmitted from the transducer 2 at every predetermined timing. The image generating module 22 displays at each pixel in the depth-ping coordinate each output sample in a color tone corresponding to the intensity of the output sample. In this embodiment, the color tone is gradually changed in the order of red, orange, yellow, green, blue, and dark blue, as the intensity of the output sample is lower. Note that in FIG. 3, for the sake of convenience, the color tone for higher intensity is illustrated as finer hatching and the color tone for lower intensity is illustrated as rougher hatching.

Moreover, in FIG. 3, a section extending in the left/right direction and illustrated as the finest hatching in the upper half of the echo image is a so-called oscillation line, indicating a position of the transducer 2 installed to the bottom of the ship. Moreover, a section extending in the left/right direction and illustrated as the finest hatching in the lower half of the echo image is a so-called water bottom line, indicating the bottom of water. Further, the two bow-shaped echo image components located slightly above the water bottom line can be estimated as caused by two single fishes.

[Operation of Signal Processor]

Figure 4:
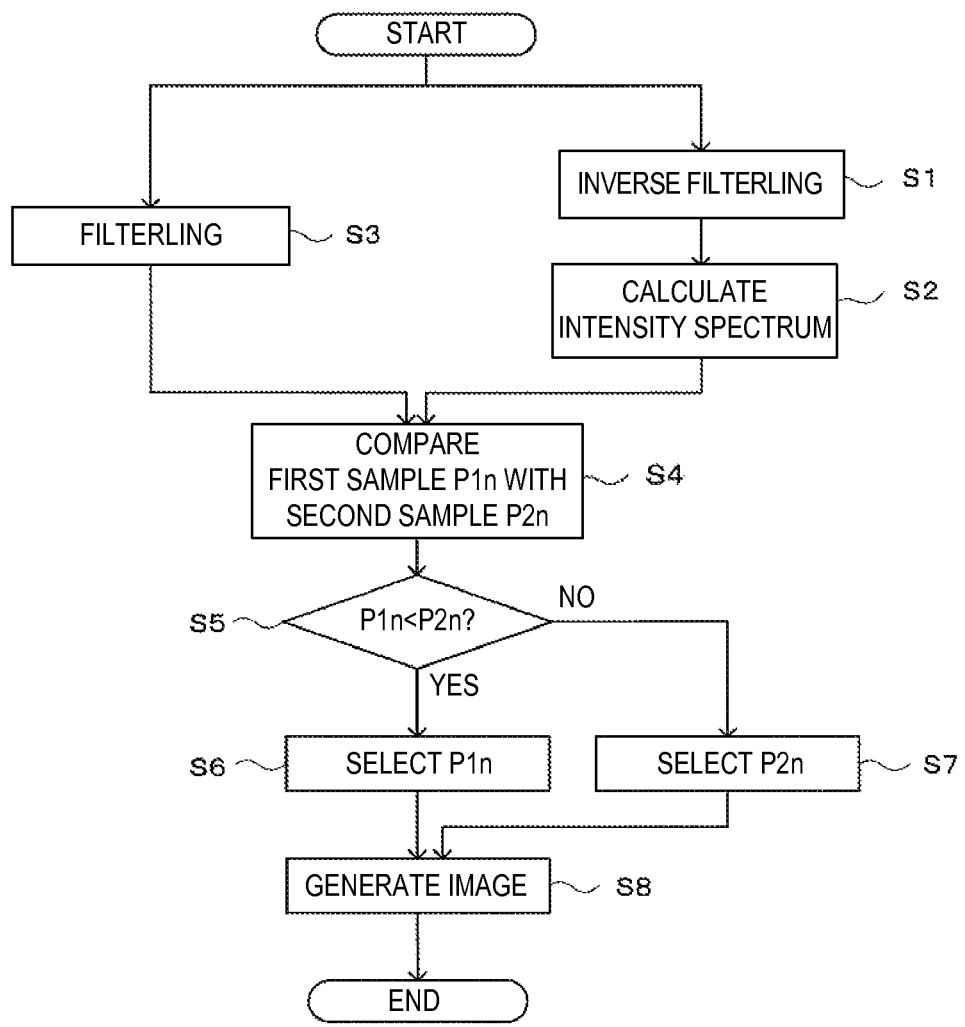
FIG. 4 is a flowchart illustrating operation of the signal processor in FIG. 2.

FIG. 4 is a flowchart for describing the operation of the signal processor 10. The operation of the signal processor 10 described above is described with reference to FIG. 4.

First at S1, the inverse filtering module 11 performs the inverse filtering on the target echo signal outputted from the transducer 2 at each ping, with respect to target echo signal along the time direction (water depth direction). Specifically, the Fourier transforming submodule 12 Fourier-transforms the target echo signal in terms of time t, and outputs the transformation result to the dividing submodule 14. Meanwhile, the instrumental function output submodule 13 Fourier-transforms the instrumental function in terms of time t, and outputs the transformation result to the dividing submodule 14. Further, the dividing submodule 14 divides the output Y from the Fourier transforming submodule 12 by the output H from the instrumental function output submodule 13, and outputs the complex vector X (=Y/H) which is the division result to the intensity spectrum calculating module 15.

Next at S2, the intensity spectrum calculating module 15 processes the complex vector X outputted from the inverse filtering module 11, so as to calculate the intensity spectrum P(t) for every ping.

Meanwhile at S3, the band-pass filtering module 20 extracts, as the filtered echo signal, the echo signal in the predetermined frequency band from the target echo signal outputted by the transducer 2.

Next at S4, the synthesizing module 21 compares the first samples $P1_n$ (n=1, 2, . . . ) constituting each intensity spectrum P(t), with the second samples $P2_n$ (n=1, 2, . . . ) of the filtered echo signal.

Figure 5:
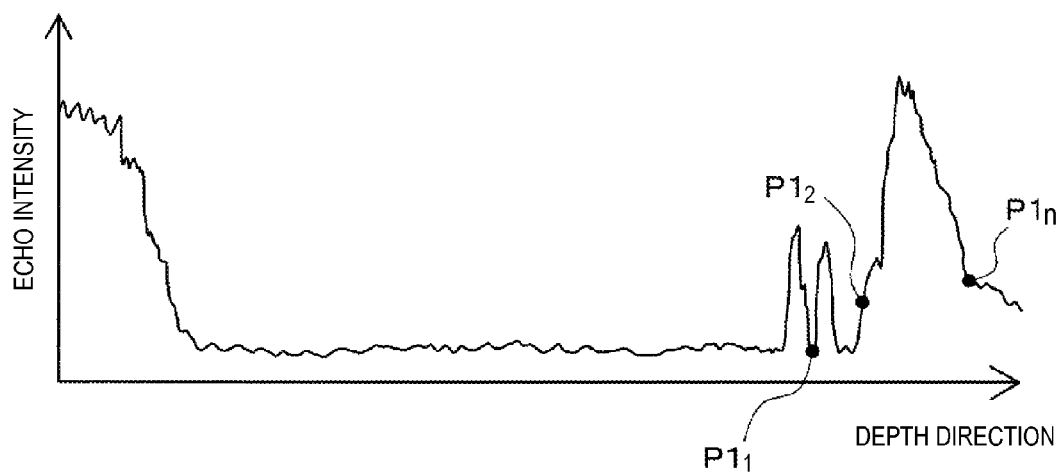
FIG. 5 is a chart illustrating an intensity spectrum in a ping $t_1$.
Figure 6:
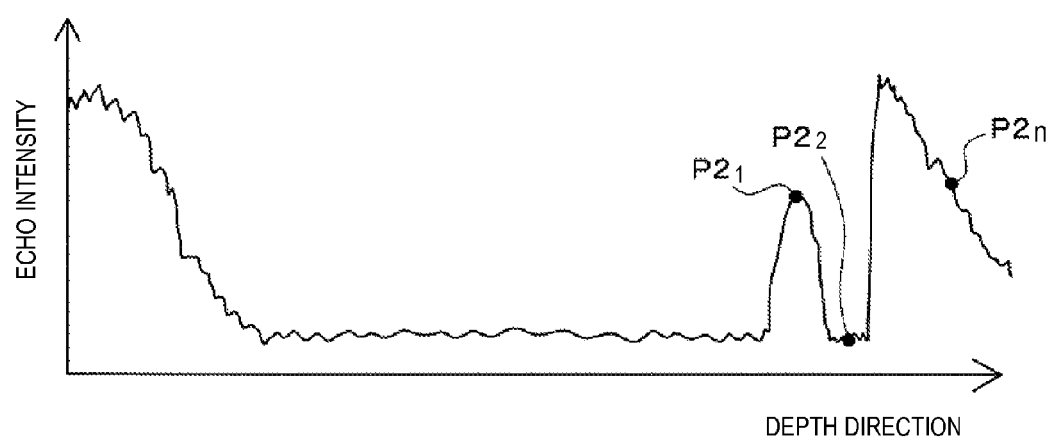
FIG. 6 is a chart illustrating an echo intensity signal based on a filtered echo signal in the ping $t_1$.
Figure 8:
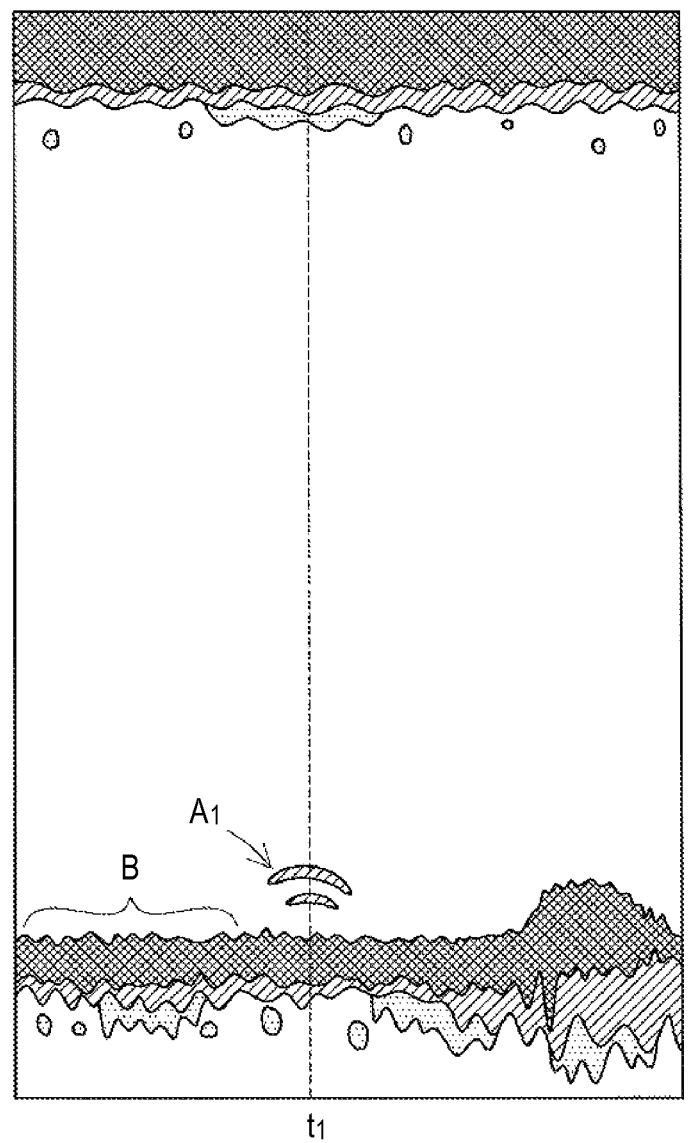
FIG. 8 is a view illustrating an example of a first echo image.

FIG. 5 is a chart illustrating the intensity spectrum P(t) in a certain ping $t_1$ (see FIG. 8). FIG. 6 is a chart illustrating an echo intensity signal based on the filtered echo signal in the same ping $t_1$. At S4, the first and second samples $P1_n$ and $P2_n$ at the corresponding position (in the same ping and at the same depth position) are compared with each other.

Further, if the intensity of the first sample $P1_n$ is lower than that of the second sample $P2_n$ (S5: YES), the synthesizing module 21 selects the first sample $P1_n$ (S6) and outputs it to the image generating module 22 as the output sample. On the other hand, if the intensity of the first sample $P1_n$ is the same as that of the second sample $P2_n$ or higher (S5: NO), the synthesizing module 21 selects the second sample $P2_n$ (S7) and outputs it to the image generating module 22 as the output sample.

Figure 7:
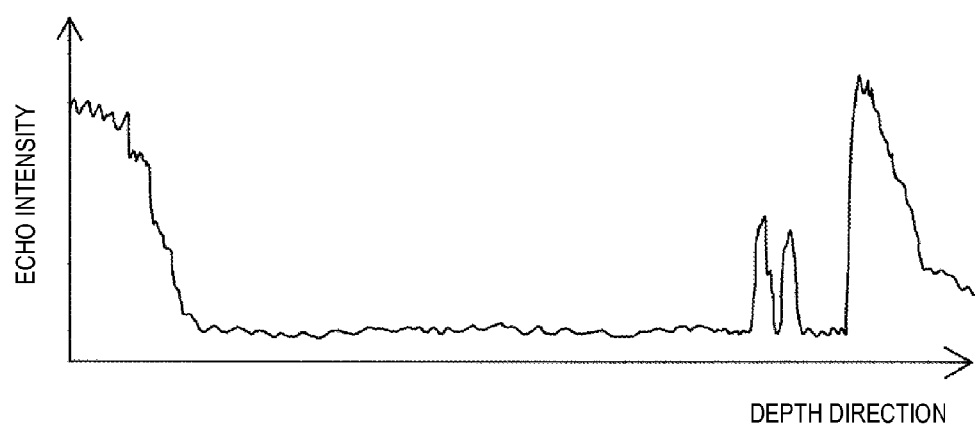
FIG. 7 is a chart illustrating an echo signal generated by a synthesizing module in the ping $t_1$.

To describe this procedure in detail with reference to FIGS. 5 and 6, between the first and second samples $P1_1$ and $P2_1$, the synthesizing module 21 selects the first sample $P1_1$, and between the first and second samples $P1_2$ and $P2_2$, the synthesizing module 21 selects the second sample $P2_2$. The synthesizing module 21 performs this comparison for all the samples of the intensity spectrum P(t) of each ping. The comparison result is the echo signal as illustrated in FIG. 7.

Then at S8, the image generating module 22 generates the echo image based on the output samples outputted from the synthesizing module 21. One example of the echo image is illustrated in FIG. 3 as described above.

[Regarding Echo Image Generated by Underwater Detecting Device 1]

Here, the echo image generated by the underwater detecting device 1 according to this embodiment will be described. However, before that, a case where the echo image is generated by only using the first samples described above (hereinafter, referred to as the first echo image) and a case where the echo image is generated by only using the second samples described above (hereinafter, referred to as the second echo image) are described.

Figure 9:
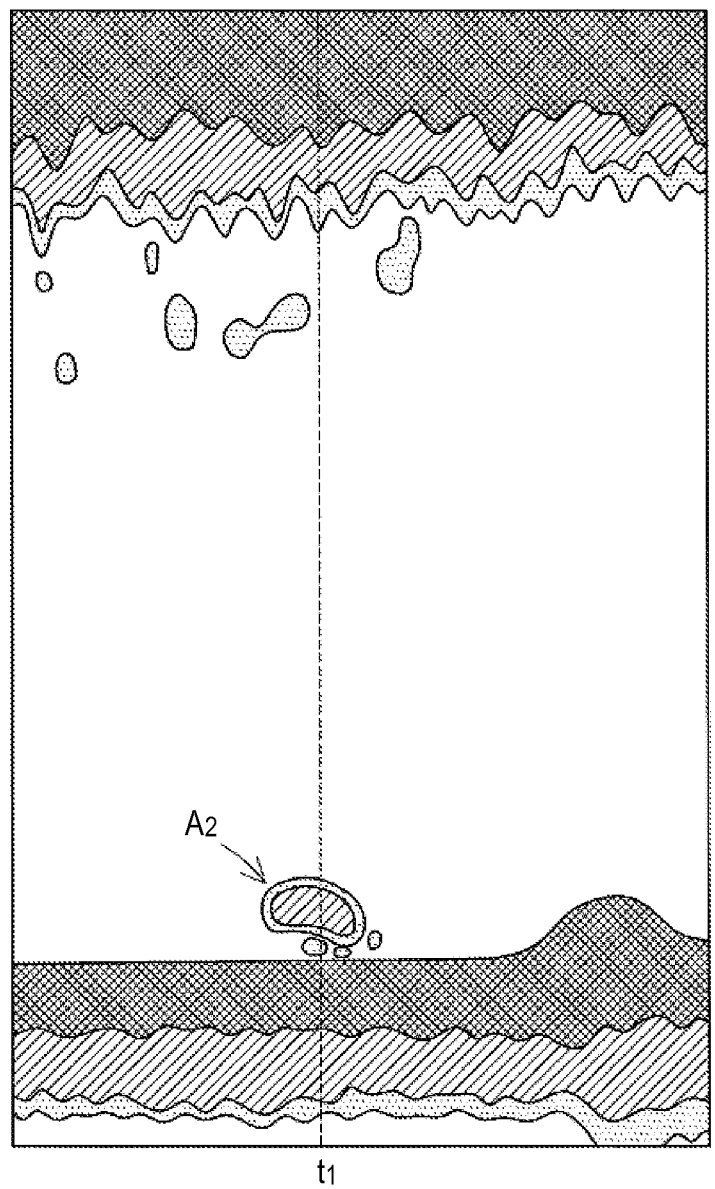
FIG. 9 is a view illustrating an example of a second echo image.

FIG. 8 is a view illustrating one example of the first echo image, and FIG. 9 is a view illustrating one example of the second echo image. In the first echo image illustrated in FIG. 8, echo image components $A_1$ resolved by high resolution are displayed. Therefore, in the example of FIG. 8, it can be estimated that the echo image components $A_1$ are caused by two single fishes. However, in the first echo image, an echo image component B (false image) which does not actually exist is generated as noise near the water bottom, which causes confusion to the operator. Additionally, if a single fish or a school of fish exists near the water bottom, it may overlap with the false image and the single fish or the school of fish may be lost. Note that, the cause of the false image is mismatch in the waveform between the instrumental function and the echo signal. Due to this mismatch, a pure sine wave cannot be obtained from the output result of the dividing submodule 14, and a sharply rising echo signal corresponding to the water bottom cannot be obtained from the intensity spectrum calculated by the intensity spectrum calculating module 15. This undulating portion is displayed as the false image.

On the other hand, in the second echo image illustrated in FIG. 9, different from the first echo image illustrated in FIG. 8, the false image is not generated near the water bottom. Therefore, a single fish or a school of fish near the water bottom is easily distinguished. However, in the second echo image, the echo image components which are resolved by high resolution in the first echo image described above are displayed in a blurry way as echo image components $A_2$. Thus, whether the echo image components $A_2$ are caused by a single fish or caused by a school of fish formed by a plurality of small-sized single fishes cannot be determined.

Figure 10:
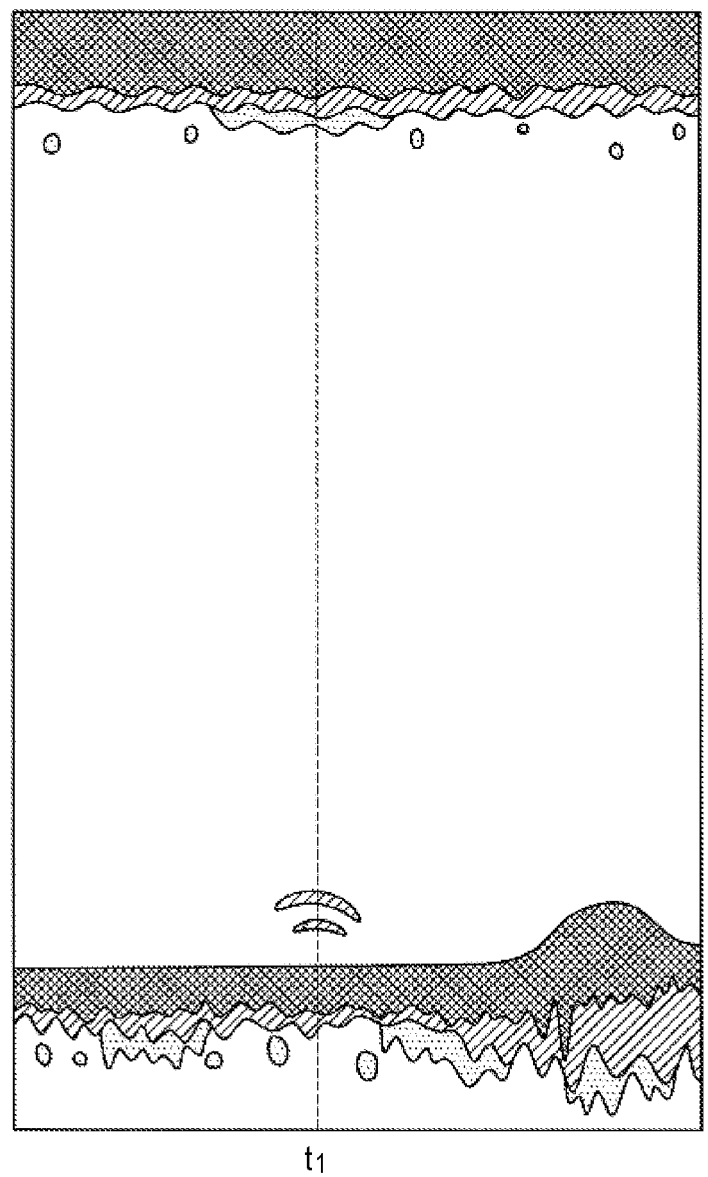
FIG. 10 is a view illustrating an example of an echo image generated by the underwater detecting device in FIG. 1.

In contrast, in the underwater detecting device 1 of this embodiment, the echo image without the defects of the first and second echo images described above can be generated. FIG. 10 is one example of the echo image generated by the underwater detecting device 1.

As described above, in the underwater detecting device 1 of this embodiment, the sample with the lowest intensity between the first and second samples corresponding to each other in terms of position is selected, and the selected sample is used as the output sample. Thus, the false image near the water bottom in the first echo image illustrated in FIG. 8 (echo image generated only by the first samples) can be removed and also the target objects (e.g., the single fishes and/or the school of fish) resolved by high resolution can be displayed.

Effects

As described above, with the signal processor 10 of this embodiment, the intensity spectrum P(t) calculated by the intensity spectrum calculating module 15 is synthesized with the filtered echo signal generated by the band-pass filtering module 20. Thus, as described above, the false image B (see FIG. 8) which is generated near the water bottom can be reduced while maintaining the high resolution of the echo image components of the target objects.

Therefore, with the signal processor 10, the false image can be reduced while maintaining the resolution of the echo image components caused by the echo signals from the target objects.

Further, with the signal processor 10 of this embodiment, the intensity spectrum P(t) is synthesized with the filtered echo signal based on the intensity of the intensity spectrum P(t) and the intensity of the filtered echo signal. Thus, the intensity spectrum P(t) can suitably be synthesized with the filtered echo signal.

Moreover, with the signal processor 10 of this embodiment, the intensity spectrum P(t) is synthesized with the filtered echo signal based on each of the first samples constituting the intensity spectrum P(t) and the second samples, corresponding to the respective first samples, constituting the filtered echo signal. Thus, the intensity spectrum P(t) can suitably be synthesized with the filtered echo signal for each sample.

Also, with the signal processor 10, the echo image is generated as the information regarding the echo signal. Thus, the information regarding the echo signal can suitably be recognized by the operator as image information.

Furthermore, with the signal processor 10, the sample with the lowest intensity between the first and second samples is generated as the output sample. Thus, the false image B generated near the water bottom can be removed without degradation of the resolution of the echo image component.

Moreover, with the signal processor 10, the high resolution signal with higher temporal resolution than the filtered echo signal generated by the band-pass filtering module 20 can suitably be generated by the inverse filtering module 11 and the intensity spectrum calculating module 15.

Additionally, in this embodiment, the underwater detecting device including the signal processor 10 which can reduce the false image while maintaining the resolution of the echo image component as described above can be provided. Furthermore, with the underwater detecting device 1, the echo image generated as described above can be displayed on the user-interface display unit 4. Therefore, the information regarding the echo signal can suitably be recognized by the operator as image information.

Modifications

Although the embodiment of this disclosure is described above, this disclosure is not limited to this, and various changes may be applied without deviating from the scope of this disclosure.

Figure 11:
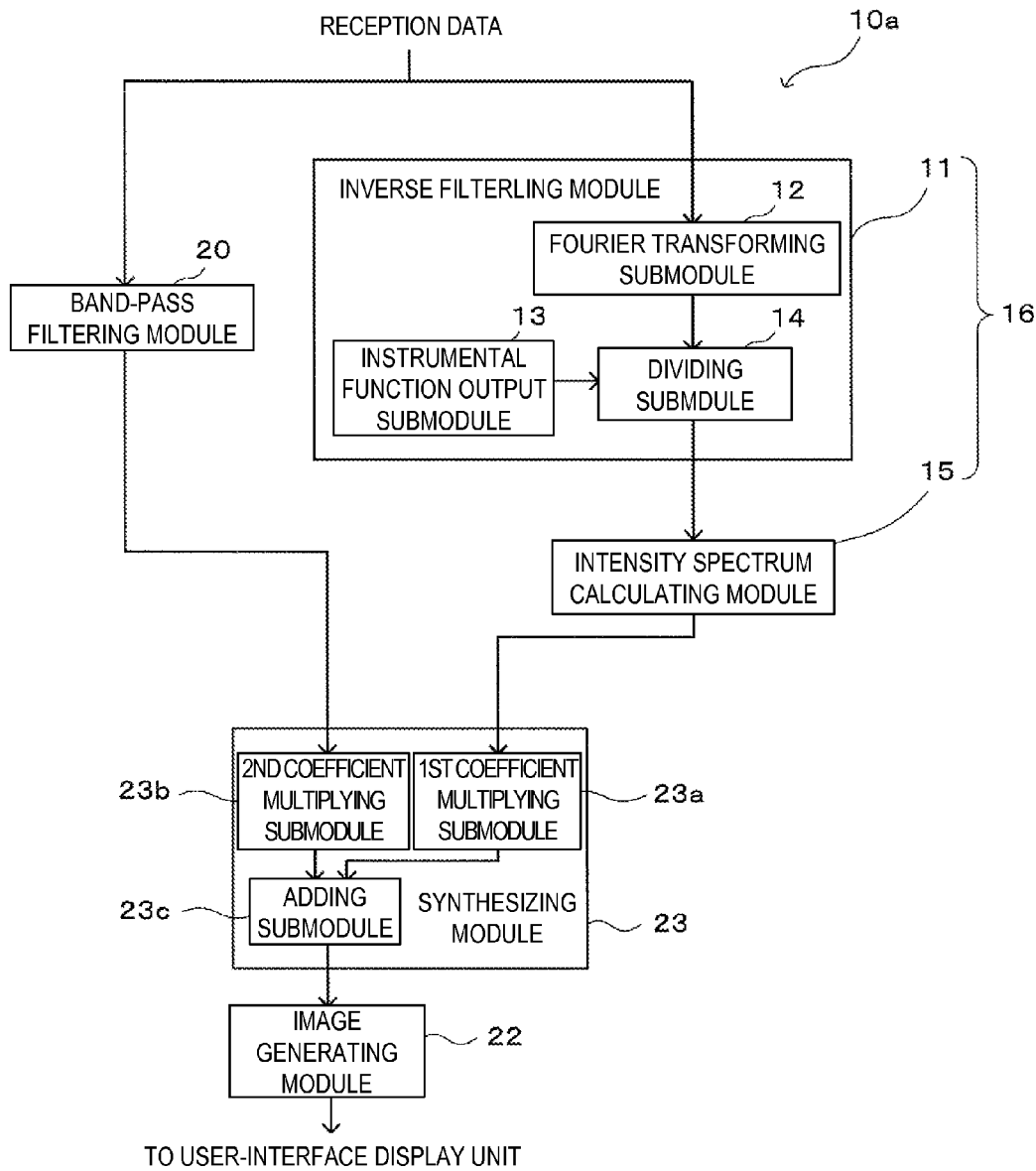
FIG. 11 is a block diagram illustrating a configuration of a signal processor of the underwater detecting device of a first modification.

FIG. 11 is a block diagram illustrating a configuration of a signal processor 10a of the underwater detecting device according to a first modification. The signal processor 10a of the first modification has a synthesizing module 23 with a significantly different configuration from the synthesizing module of the signal processor 10 of the above embodiment. Hereinafter, the configuration of the synthesizing module 23 is mainly described, and the description of other parts is omitted.

Differently from the synthesizing module 21 of the above embodiment, the synthesizing module 23 of this modification weights the first and second samples. Further, the weighted first and second samples are added and synthesized with each other, so as to generate the output sample. The synthesizing module 23 includes a first coefficient multiplying submodule 23a, a second coefficient multiplying submodule 23b, and an adding submodule 23c.

The first coefficient multiplying submodule 23a multiplies each of the first samples of the intensity spectrum P(t) calculated by the intensity spectrum calculating module 15 by a first coefficient. The second coefficient multiplying submodule 23b multiplies each of the second samples outputted from the band-pass filtering module 20 by a second coefficient. The adding submodule 23c generates the output sample by adding the first sample multiplied by the first coefficient to the second sample multiplied by the second coefficient. The image generating module 22 generates the echo image based on the output sample. Also by generating the echo image in the above manner, the false image which is caused near the water bottom can be reduced while maintaining the resolution of the echo image components caused by the target objects. Note that, the first and second coefficients described above are set to values whose sum equals 1.

Figure 12:
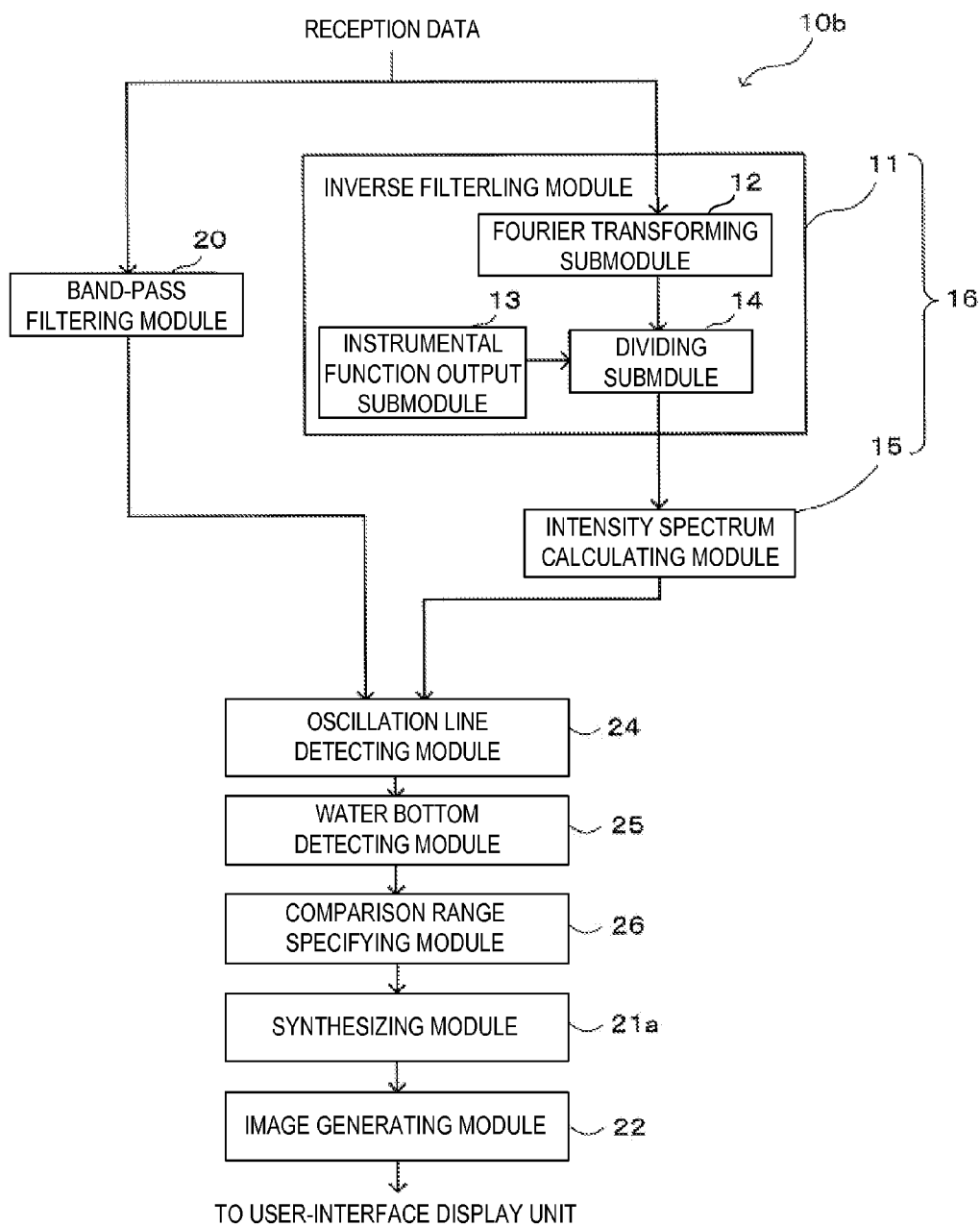
FIG. 12 is a block diagram illustrating a configuration of a signal processor of the underwater detecting device of a second modification.

FIG. 12 is a block diagram illustrating a configuration of a signal processor 10b of the underwater detecting device according to a second modification. Within a predetermined depth range, the signal processor 10b of this modification selects, as the output sample, the sample with the lowest intensity between the first and second samples, as in the above embodiment. On the other hand, differently from the above embodiment, outside of the predetermined depth range, the signal processor 10b selects the first sample as the output sample. The signal processor 10b of this modification includes an oscillation line position detecting module 24, a water bottom detecting module 25 (water bottom detector), and a comparison range specifying module 26 (synthesizing range specifying module) in addition to the components provided to the signal processor 10 of the above embodiment (e.g., the inverse filtering module 11 and the intensity spectrum calculating module 15).

The oscillation line position detecting module 24 detects the position of the oscillation line based on the output results from the intensity spectrum calculating module 15, the band-pass filtering module 20 and the like. Note that, the oscillation line indicates the position of the transducer 2, and depending for example on a frequency of the ultrasonic wave transmitted from the transducer 2, a width of the oscillating line changes.

The water bottom detecting module 25 detects the depth position of the water bottom based on the output results from the intensity spectrum calculating module 15, the band-pass filtering module 20 and the like.

The comparison range specifying module 26 specifies depth ranges (comparison ranges) within which the two samples (first and second samples) are compared by a synthesizing module 21a, based on the position of the oscillation line detected by the oscillation line position detecting module 24 and the depth position of the water bottom detected by the water bottom detecting module 25. Specifically, the comparison range specifying module 26 specifies the comparison ranges to be a predetermined depth range including the position of the oscillation line and a predetermined depth range including the depth position of the water bottom, respectively.

The synthesizing module 21a operates differently from the synthesizing module 21 of the above embodiment. Specifically, within the comparison ranges, similar to the above embodiment, the synthesizing module 21a compares the first and second samples with each other and selects the sample with the lowest intensity as the output sample. On the other hand, for the first and second samples outside the comparison ranges, the synthesizing module 21a selects the first sample as the output sample without performing the above comparison.

In the echo image, the false image is easily caused within a range near the water bottom or near the oscillation line of the image generated based on the first samples. On the other hand, the false image is not easily caused other than near the water bottom or near the oscillation line. Therefore, as this modification, within the ranges where the false image is easily caused (comparison ranges), by comparing the first sample with the second sample and selecting the sample with the lowest intensity, the false image can be reduced. On the other hand, outside the comparison ranges, by selecting the first sample as the output sample, a calculation load in signal processing performed by the signal processor 10b can be reduced.

In the above embodiment, the example of applying the signal processor 10 to the underwater detecting device 1 is described; however, without limiting to this, the signal processor may be applied to a radar apparatus.

Figure 13:
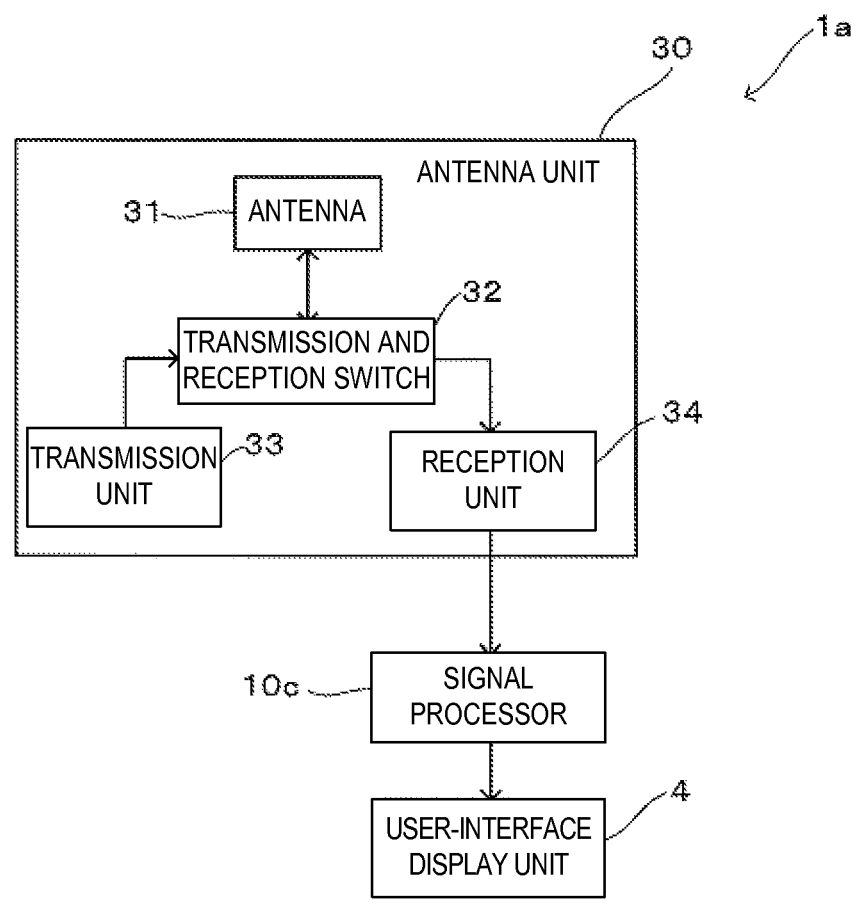
FIG. 13 is a block diagram illustrating a configuration of a radar apparatus according to a second embodiment.

FIG. 13 is a block diagram illustrating a configuration of a radar apparatus 1a according to a second embodiment. As illustrated in FIG. 13, the radar apparatus 1a includes an antenna unit 30, a signal processor 10c, and a user-interface display unit 4. The radar apparatus 1a is a ship radar provided to a ship (e.g., fishing boat) and is used for mainly detecting a target object (e.g., another ship).

The antenna unit 30 includes an antenna 31, a transmission and reception switch 32, a transmission unit 33, and a reception unit 34.

The antenna 31 transmits a pulse-shaped radio wave having a directivity and receives an echo (reflection wave) from the target object. The radar apparatus 1a can acquire a distance r from the radar apparatus 1a to the target object by measuring a time length from the transmission of the pulse-shaped radio wave until the reception of the echo by the antenna 31. Moreover, the antenna 31 is rotatable by 360 degrees on the horizontal plane, and repeats the transmission and reception of the radio wave while changing the transmission direction of the pulse-shaped radio wave (changing an antenna angle θ). Note that, the antenna 31 outputs an angular signal indicating the antenna angle (=azimuth angle) θ to the signal processor 10c. With the above configuration, the antenna 31 can detect the target object over 360 degrees on the plane around the ship. Examples of the antenna 31 include a slot array antenna, a patch antenna, and a parabola antenna.

In the transmission, the transmission and reception switch 32 switches the connection in the antenna unit 30 such that the transmission signal is transmitted from the transmission unit 33 to the antenna 31. In the reception, the transmission and reception switch 32 switches the connection in the antenna unit 30 such that the echo received by the antenna 31 is transmitted from the antenna 31 to the reception unit 34.

The transmission unit 33 has, for example, a D/A converter, a frequency converter, and an electric amplifier (all not illustrated) to create microwave oscillation. The transmission unit 33 generates a radar transmission signal and outputs it to the antenna 31.

The reception unit 34 amplifies the signal received by the antenna 31 and A/D converts the amplified reception signal. Then, the reception unit 34 outputs the digitally converted reception data (target echo signal) to the signal processor 10c.

Figure 14:
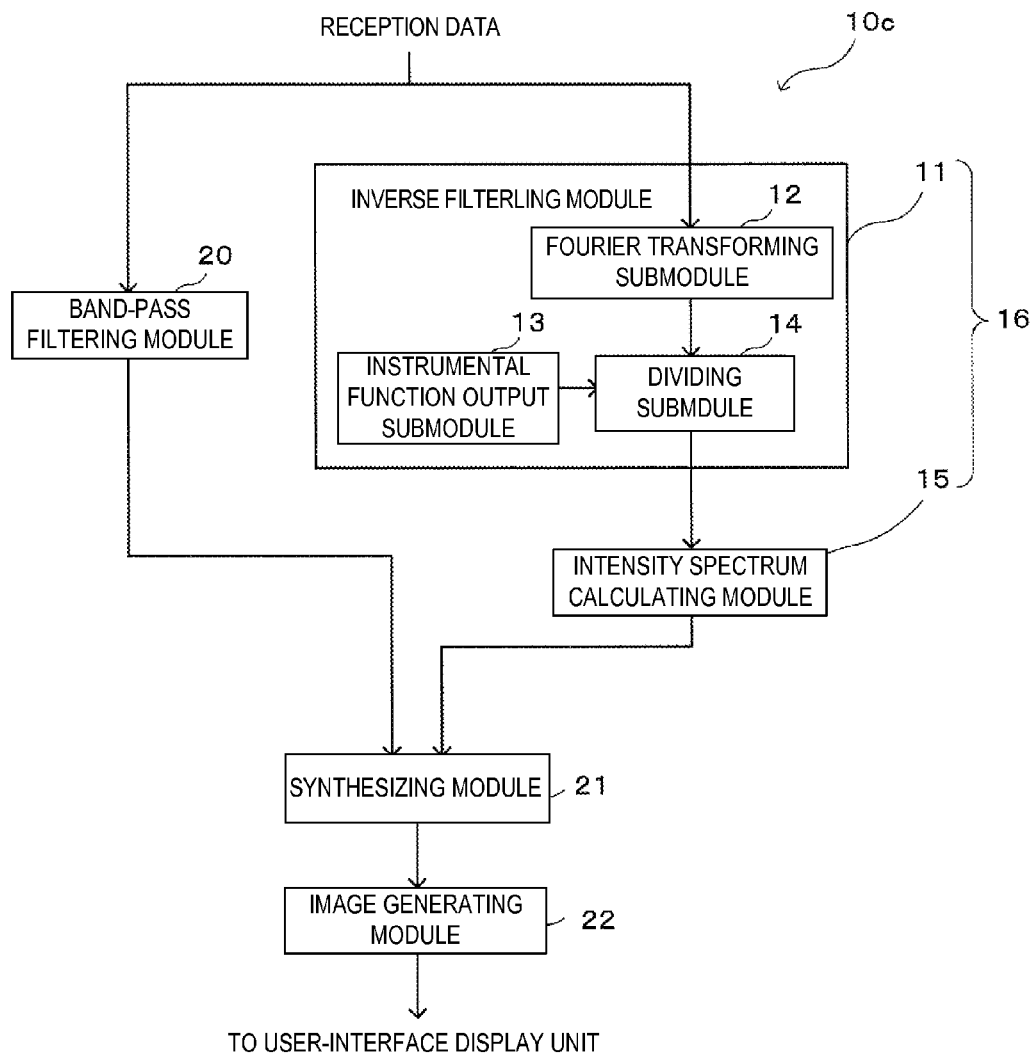
FIG. 14 is a block diagram illustrating a configuration of a signal processor of the radar apparatus in FIG. 13.

FIG. 14 is a block diagram illustrating a configuration of the signal processor 10c of the radar apparatus 1a in FIG. 13. The signal processor 10c generates an echo image by processing the reception data outputted from the antenna unit 30 similarly to the case of the signal processor 10 of the underwater detecting device 1 described above.

The echo image generated as described above is displayed on the user-interface display unit 4, as the information regarding the echo signal.

Moreover, the inverse filtering module 11 is not limited to perform the processing described in the above embodiments, as long as the influence of the instrumental function of the transducer 2 can be removed. For example, in a third modification, the inverse filtering module 11 performs Wiener filtering. Specifically, the complex vector X may be obtained based on the following Equation 1 by the dividing submodule 14 and outputted to the intensity spectrum calculating module 15.

$$X = \frac{YH^*}{|H|^2 + \alpha} \quad (1)$$

In the above Equation 1, * indicates a complex conjugation and α indicates a Wiener parameter (0≤α≤1).

In the above embodiments, the high resolution signal is generated by the inverse filtering module 11 and the intensity spectrum calculating module 15; however, it is not limited to this. Specifically, in a fourth modification described below, the high resolution signal is generated by so-called pulse compression.

Figure 15:
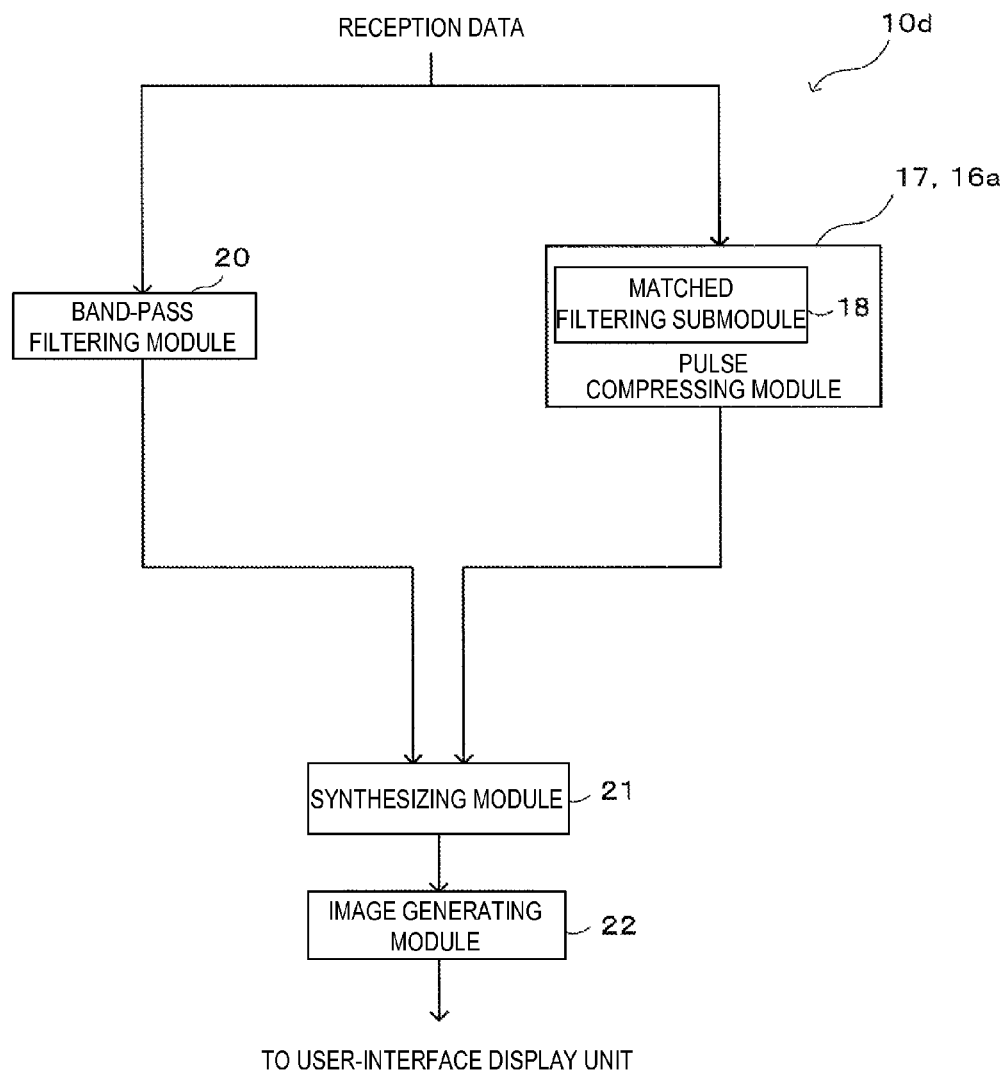
FIG. 15 is a block diagram illustrating a configuration of a signal processor of the underwater detecting device of a fourth modification.

FIG. 15 is a block diagram illustrating a configuration of a signal processor 10d of the underwater detecting device of the fourth modification. In this modification, a high resolution signal generating unit 16a (high resolution signal generator) may be configured with a pulse compressing module 17 (pulse compressor). Note that, in this modification, for example, the transducer transmits a chirp signal of which frequency changes linearly with time, at every predetermined timing for a predetermined period of time.

The pulse compressing module 17 has a matched filtering submodule 18. The matched filtering submodule 18 pulse-compresses the reception signal by correlating the signal received by the transducer 2 with a reference signal predetermined based on the transmission signal (chirp signal). Thus, the high resolution signal with high temporal resolution can be generated.

Then, the synthesizing module 21 synthesizes the filtered echo signal extracted by the band-pass filtering module 20 with the signal generated by the pulse compressing module 17, similar to the above embodiment.

Note that, also with the high resolution signal generated by the pulse compressing module 17, the echo image component B (false image) as illustrated in FIG. 8 is caused similarly to the above embodiment. By performing the synthesis as described above by the synthesizing module 21 similar to the above embodiment, the false image can be reduced while maintaining the resolution of the echo image caused by the echo signal from the target object.

Figure 16:
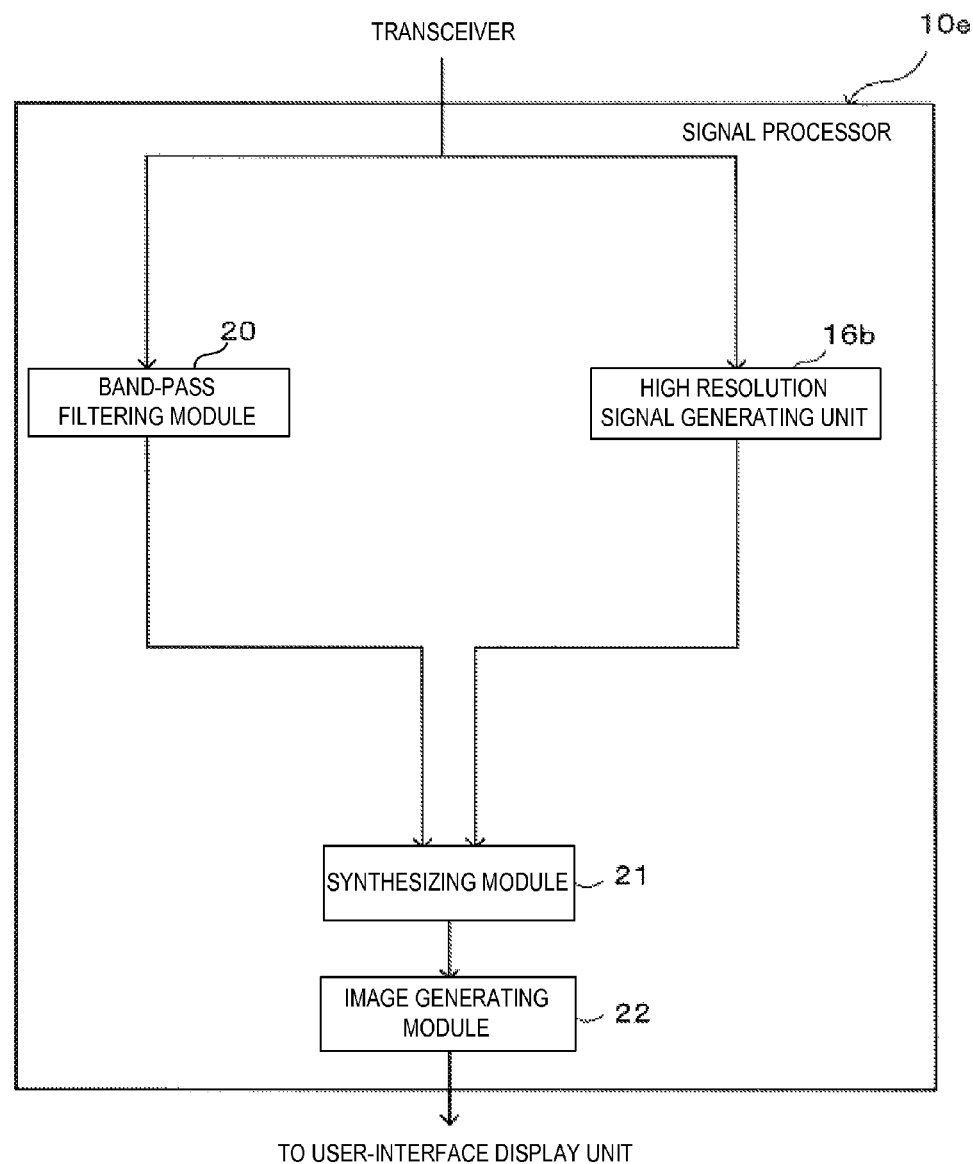
FIG. 16 is a block diagram illustrating a configuration of a signal processor according a fifth modification.

FIG. 16 is a block diagram illustrating a configuration of a signal processor 10e according a fifth modification. As illustrated in FIG. 16, this disclosure is applicable to a signal processor which does not include a transducer or a user-interface display unit, different from the case of the underwater detecting device 1 of the above embodiment. Moreover, a high resolution signal generating unit 16b (high resolution signal generator) of the signal processor 10e may have the inverse filtering module 11 and the intensity spectrum calculating module 15 described above, or may be configured with the pulse compressing module 17. Further, without limiting to these, the high resolution signal generating unit 16b may have any configuration as long as it can generate a signal with higher temporal resolution than the filtered echo signal generated by the band-pass filtering module 20.

Figure 17B:
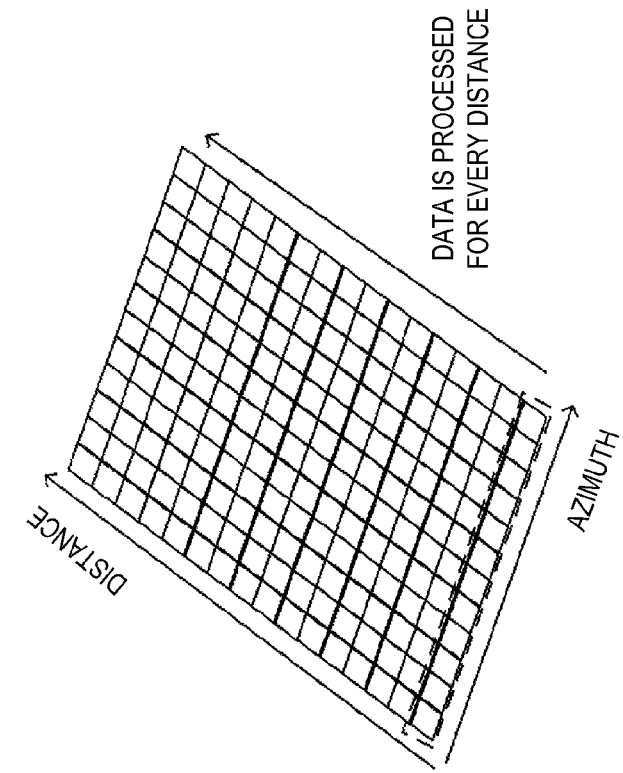
FIG. 17B is a view for describing signal processing performed by a signal processor according to a sixth modification.
Figure 17A:
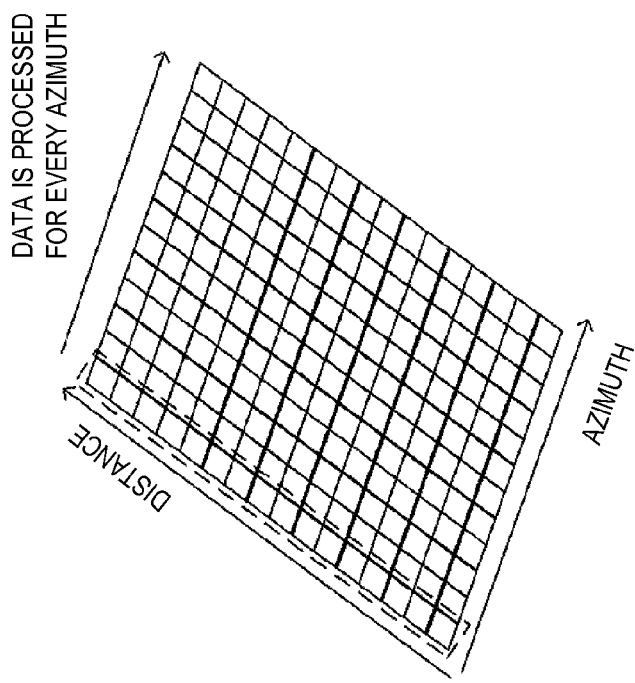
FIG. 17A is a view for describing signal processing performed by a signal processor in FIG. 2.

FIG. 17A is a view for describing the signal processing performed by the signal processor of the above embodiments, and FIG. 17B is a view for describing signal processing performed by a signal processor according to a sixth modification. In the above embodiments, as illustrated in FIG. 17A, the intensity spectrum is calculated for every azimuth (i.e., every ping). Thus, the high resolution signal resolved by high resolution in the time direction (distance direction) is calculated. Further, by synthesizing the high resolution signal with the filtered echo signal, the false image caused due to the high resolution signal with high temporal resolution can be reduced.

On the other hand, in this modification, as illustrated in FIG. 17B, an intensity spectrum is calculated for every predetermined time interval (i.e., every predetermined distance). Thus, a high resolution signal resolved by high resolution in the azimuth direction is calculated. Further, by synthesizing the high resolution signal with the filtered echo signal by comparing the first and second samples having corresponding azimuth, the false image caused due to the high resolution signal with high azimuth resolution can be reduced.

Note that, in this modification, for example, either one of a low-pass filtering module (moving average filtering module) to reduce random noise and an order-statistic filtering module (rank filtering module) to reduce spike-like noise caused by interference signal from a radar of another ship may be used as the filtering module. Moreover, as the high resolution signal generating unit, the inverse filtering module and the intensity spectrum calculating module may be used similar to the above embodiments, or a matched filtering module may be used.

Figure 18:
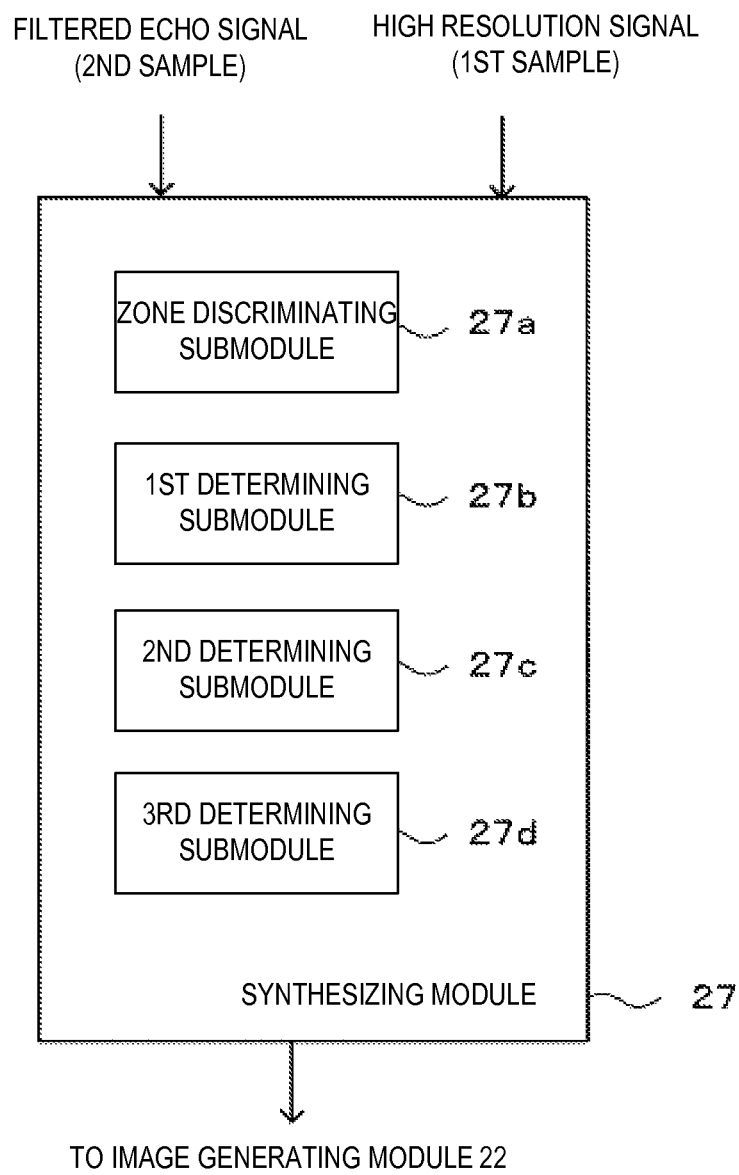
FIG. 18 is a block diagram illustrating a configuration of a synthesizing module of the underwater detecting device according to a seventh modification.
Figure 19:
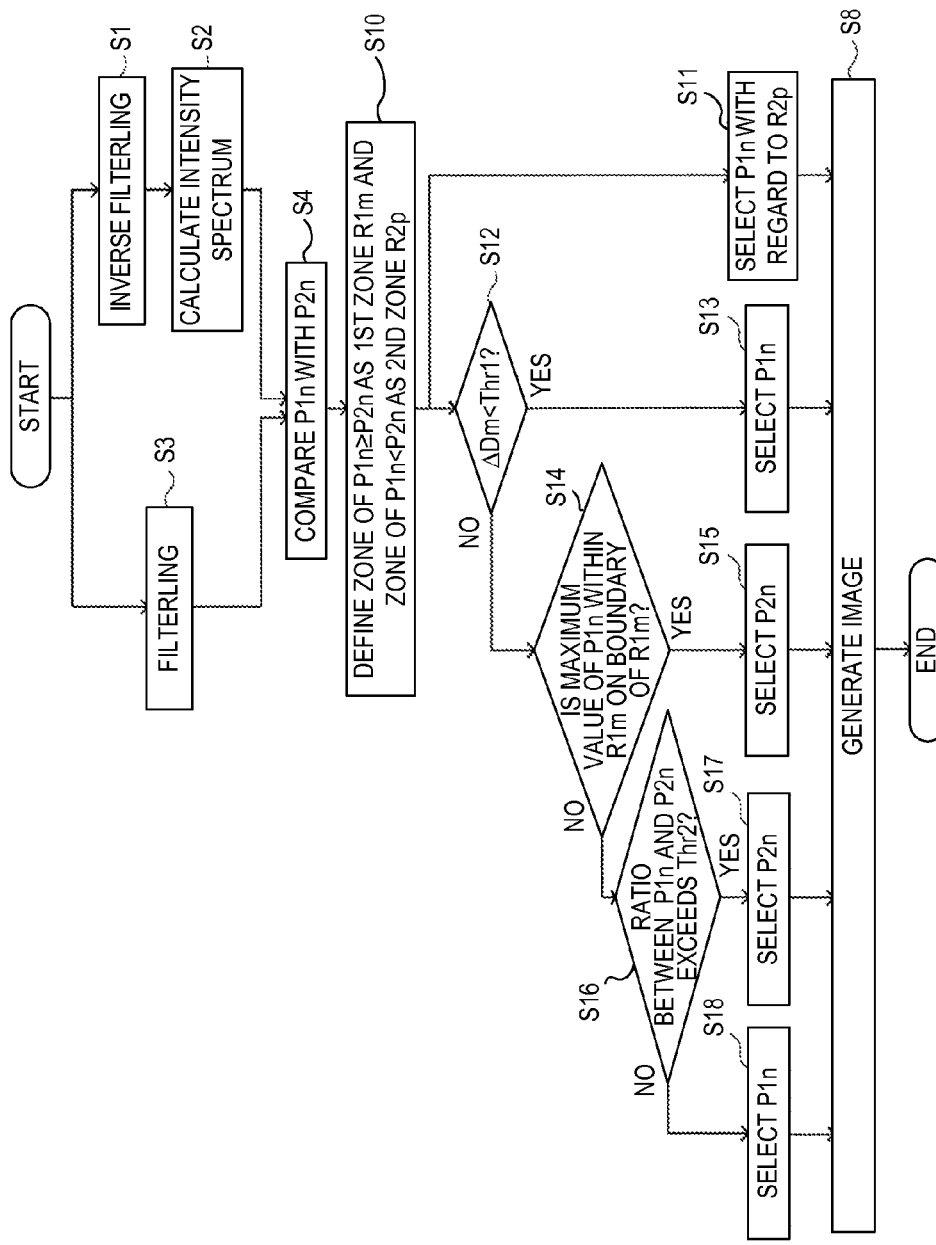
FIG. 19 is a flowchart for describing operation of the signal processor of the underwater detecting device according to the seventh modification.

FIG. 18 is a block diagram illustrating a configuration of a synthesizing module 27 of the underwater detecting device according to a seventh modification. FIG. 19 is a flowchart for describing operation of the signal processor of the underwater detecting device according to the seventh modification. The signal processor of this modification is different in the configuration and operation of the synthesizing module compared to the signal processor of the above embodiment.

[Configuration of Synthesizing Module]

The synthesizing module 27 of the underwater detecting device of this modification includes a zone discriminating submodule 27a (zone discriminator) and three determining submodules (a first determining submodule 27b, a second determining submodule 27c, and a third determining submodule 27d). The synthesizing module 27 selects one of the first and second samples by comparing the intensity of the first sample with the intensity of the second sample corresponding to the first sample.

Figure 20:
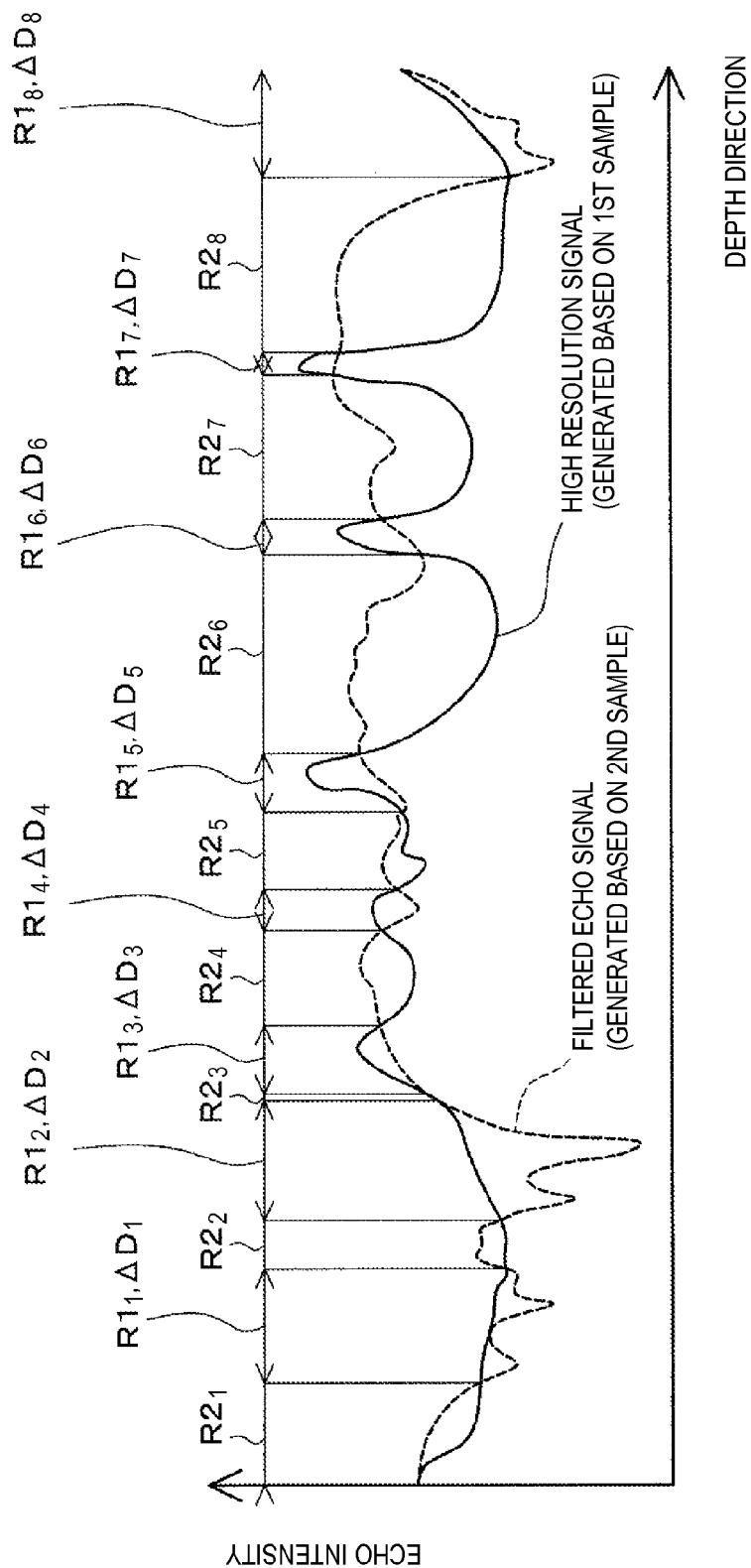
FIG. 20 is a chart illustrating a high resolution signal and a filtered echo signal in a certain ping, for describing first and second zones which are defined by a zone discriminating submodule in FIG. 18.

FIG. 20 is a chart for describing first zones $R1_m$ and second zones $R2_p$ which are defined by the zone discriminating submodule 27a. The zone discriminating submodule 27a compares the first sample $P1_n$ of the high resolution signal with the second sample $P2_n$ which is at the same depth position and in the same ping as the first sample $P1_n$. Then, as illustrated in FIG. 20, the zone discriminating submodule 27a defines a zone where the intensity of the first sample $P1_n$ is the same or higher than that of the second sample $P2_n$ as the first zone $R1_m$ (m=1, 2, . . . ), and defines a zone where the intensity of the first sample $P1_n$ is lower than that of the second sample $P2_n$ as the second zone $R2_p$ (p=1, 2, . . . ). Further, within the second zone $R2_p$, the synthesizing module 27 outputs the first sample $P1_n$ as the output sample to the image generating module 22.

The first determining submodule 27b determines whether a value of a depth range width $\Delta D_m$ (distance range) of each first zone $R1_m$ is lower than a predetermined threshold Thr1. The threshold Thr1 is set to a suitable value based on experiments conducted in advance, for example. Within the first zone $R1_m$, if the value of the depth range width $\Delta D_m$ is lower than the threshold Thr1, the synthesizing module 27 outputs the first sample $P1_n$ as the output sample to the image generating module 22. On the other hand, within the first zone $R1_m$, if the value of the depth range width $\Delta D_m$ is the threshold Thr1 or higher, the determination of the sample (between the first and second samples $P1_n$ and $P2_n$) to be outputted as the output sample to the image generating module 22 is passed on to determination performed by the second determining submodule 27c or determination thereafter.

The second determining submodule 27c performs the following determination within each zone $R1_m$ where the value of the depth range width $\Delta D_m$ is determined to be the threshold Thr1 or higher by the first determining submodule 27b. Specifically, the second determining submodule 27c determines whether the first sample $P1_n$ with the highest intensity within the first zone $R1_m$ as described above is on a boundary with the second zone $R2_p$ adjacent to the first zone $R1_m$. Within the first zone $R1_m$, if the first sample $P1_n$ with the highest intensity is on the boundary of this first zone $R1_m$, the synthesizing module 27 outputs the second sample $P2_n$ as the output sample to the image generating module 22. Within the first zone $R1_m$, if the first sample $P1_n$ with the highest intensity is not on the boundary of the first zone $R1_m$, the determination of the sample (between the first and second samples $P1_n$ and $P2_n$) to be outputted as the output sample to the image generating module 22 is passed on to determination performed by the third determining submodule 27d.

The third determining submodule 27d performs the following determination within each zone $R1_m$ where the first sample $P1_n$ with the highest intensity is determined to be not on the boundary described above by the second determining submodule 27c. Specifically, the third determining submodule 27d determines whether a maximum value among ratios between the intensities of the first and second samples $P1_n$ and $P2_n$ at the same depth position as each other (more specifically, the ratio of the intensity of $P1_n$ with respect to the intensity of $P2_n$) exceeds a predetermined threshold Thr2. The threshold Thr2 is set to a suitable value based on experiments conducted in advance, for example. Within the first zone $R1_m$, if the maximum value exceeds the threshold Thr2, the synthesizing module 27 outputs the second sample $P2_n$ as the output sample to the image generating module 22. Within this first zone $R1_m$, if the maximum value described above is the threshold Thr2 or lower, the synthesizing module 27 outputs the first sample $P1_n$ as the output sample to the image generating module 22. Note that in this modification, the intensity of each sample is expressed on a linear scale. In a case where the intensity of each sample is expressed on a log scale, the third determining submodule 27d determines whether the maximum value among differences between the intensities of the first and second samples $P1_n$ and $P2_n$ at the same depth position as each other (more specifically, values obtained by subtracting the intensity of $P1_n$ by the intensity of $P2_n$) exceeds the predetermined threshold Thr2.

[Operation of Signal Processor]

Next, the operation of the signal processor of this modification is described. With reference to FIG. 19, at S1 and S2, the intensity spectrum calculating module 15 and the like calculate the intensity spectrum P(t), in other words the high resolution signal, in every ping by operating similar to the above embodiment. Meanwhile, at S3, the band-pass filtering module 20 generates the filtered echo signal by operating similar to the above embodiment. Further, at S4, the synthesizing module 27 compares the first sample $P1_n$ with the second sample $P2_n$.

Next, at S10, the zone discriminating submodule 27a discriminates between the first and second zones $R1_m$ and $R2_p$, and as illustrated in FIG. 20, the entire range of each of the high resolution signal and the filtered echo signal in the depth direction is divided into the first and second zones $R1_m$ and $R2_p$. Further, within the second zone $R2_p$, the synthesizing module 27 selects the first sample $P1_n$ (S11) and outputs it as the output sample to the image generating module 22.

Next, at S12, the first determining submodule 27b compares the value of depth range width $\Delta D_m$ of each first zone $R1_m$ with the threshold Thr1 to determine whether the value of depth range width $\Delta D_m$ is lower than the threshold Thr1 for all the first zones $R1_m$. If the value of depth range width $\Delta D_m$ is lower than the threshold Thr1 (S12: YES), the synthesizing module 27 selects the first sample $P1_n$ within the first zone $R1_m$ (S13) and outputs it as the output sample to the image generating module 22. In the example of FIG. 20, the synthesizing module 27 selects the first sample as the output sample within the first zones $R1_4$, $R1_5$, $R1_6$ and $R1_7$. On the other hand, if the value of the depth range width $\Delta D_m$ is the threshold Thr1 or higher (S12: NO), the procedure proceeds to S14.

Next at S14, for each of the first zones $R1_m$ where the value of the depth range width $\Delta D_m$ is determined to be the threshold Thr1 or higher by the first determining submodule 27b, the second determining submodule 27c determines whether the first sample $P1_n$ with the highest intensity within the corresponding first zone $R1_m$ is on the boundary of the first zone $R1_m$. If the first sample $P1_n$ with the highest intensity is on the boundary of the first zone $R1_m$ (S14: YES), the synthesizing module 27 selects the second sample $P2_n$ within the corresponding first zone $R1_m$ (S15) and outputs it as the output sample to the image generating module 22. In the example of FIG. 20, the synthesizing module 27 selects the second sample as the output sample within the first zones $R1_1$, $R1_2$ and $R1_8$. On the other hand, if the first sample $P1_n$ with the highest intensity is not on the boundary of the first zone $R1_m$ (S14: NO), the procedure proceeds to S16.

Next at S16, the third determining submodule 27d performs the following determination within each zone $R1_m$ where the first sample $P1_n$ with the highest intensity is determined to be not on the boundary of the first zone $R1_m$ by the second determining submodule 27c. Specifically, at S16, the third determining submodule 27d determines whether the maximum value among the ratios between the intensities of the first and second samples $P1_n$ and $P2_n$ at the same depth position as each other exceeds the predetermined threshold Thr2. If the maximum value exceeds the threshold Thr2 (S16: YES), the synthesizing module 27 selects the second sample $P2_n$ within the corresponding first zone $R1_m$ (S17) and outputs it as the output sample to the image generating module 22. On the other hand, if the maximum value described above is the threshold Thr2 or lower (S16: NO), the synthesizing module 27 selects the first sample $P1_n$ within the first zone $R1_m$ (S18) and outputs it as the output sample to the image generating module 22. In the example of FIG. 20, the synthesizing module 27 selects the first sample as the output sample within the first zone $R1_3$.

Finally at S8, the image generating module 22 generates the echo image based on the output sample outputted from the synthesizing module 27.

[Regarding Echo Image Generated by Underwater Detecting Device of this Modification]

Here, the echo image generated by the underwater detecting device according to this modification will be described. However, before that, the first echo image generated by only using the first samples, the second echo image generated by only using the second samples, and the echo image generated by the underwater detecting device 1 of the above embodiment are described. Note that, each of these echo images indicates an example where a plurality of single fishes existing in a comparatively dense condition are displayed.

Figure 21:
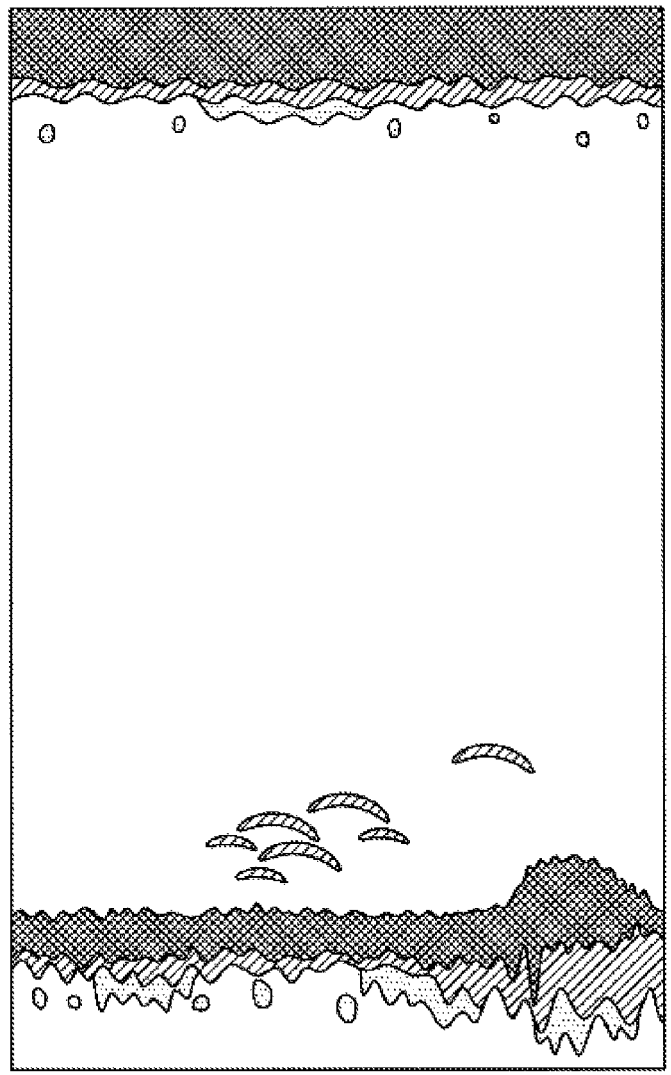
FIG. 21 is a view illustrating one example of the first echo image in a state where single fishes exist in a dense condition.
Figure 22:
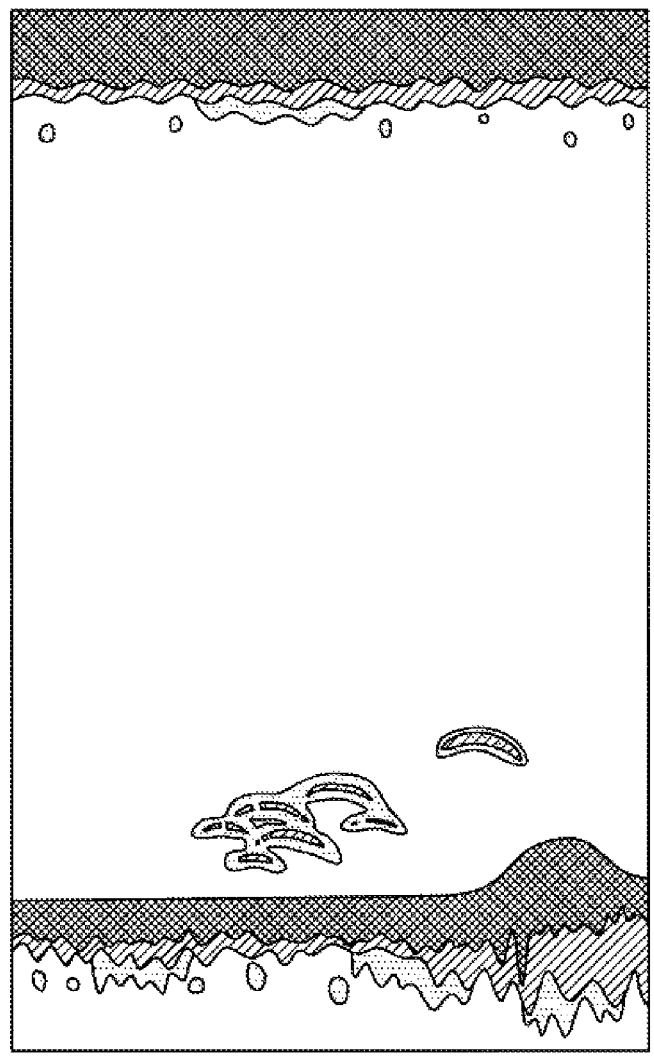
FIG. 22 is a view illustrating one example of the second echo image in a state where single fishes exist in a dense condition.
Figure 23:
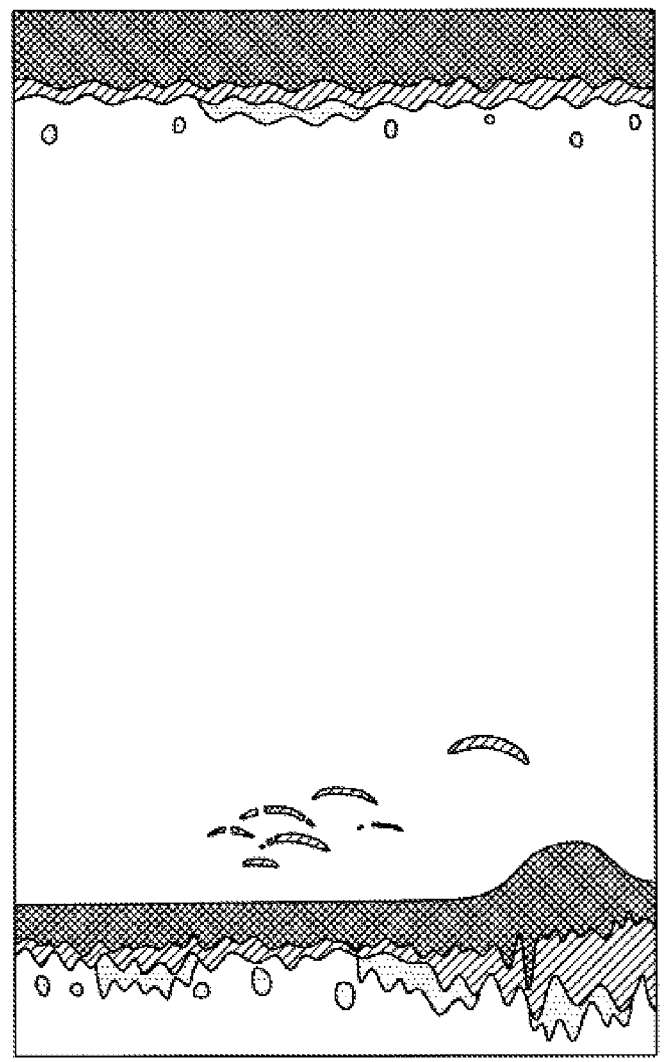
FIG. 23 is a view illustrating one example of an echo image generated by the underwater detecting device in FIG. 1, in a state where single fishes exist in a dense condition.

FIG. 21 is a view illustrating one example of the first echo image in a state where single fishes exist in a dense condition. Moreover, FIG. 22 is a view illustrating one example of the second echo image in a state where single fishes exist in a dense condition. FIG. 23 is a view illustrating one example of the echo image generated by the underwater detecting device in FIG. 1, in a state where single fishes exist in a dense condition.

In the first echo image, even in the state where single fishes exist underwater in a dense condition, as illustrated in FIG. 21, echo image components of the respective single fishes resolved by high resolution are displayed. On the other hand, in the second echo image, in the state where single fishes exist underwater in a dense condition, as illustrated in FIG. 22, echoes of single fishes close to each other interfere to cancel or enhance each other. As a result, in the echo image generated based on the output samples synthesized by the synthesizing module 21 of the underwater detecting device 1 of the above embodiment, as illustrated in FIG. 23, the echo image components of the single fishes which are resolved by high resolution (see FIG. 21) are partially removed, causing severe deterioration in the visibility of the echo image components.

Figure 24:
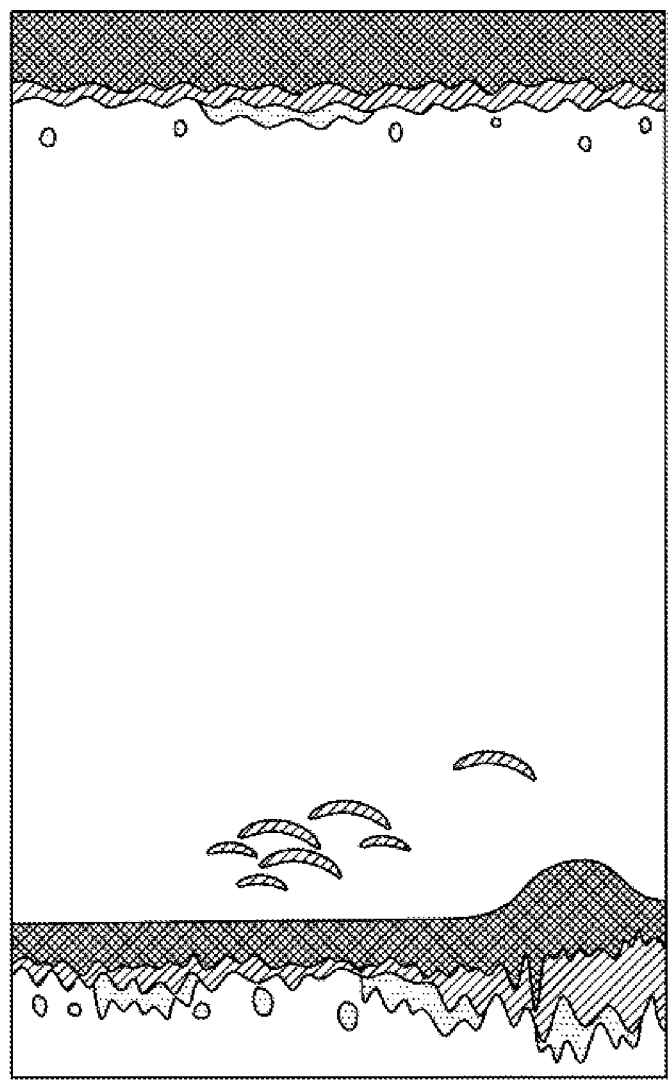
FIG. 24 is a view illustrating one example of an echo image generated by the underwater detecting device of the seventh modification, in a state where single fishes exist in a dense condition.

In this regard, with the synthesizing module 27 of this modification, by operating as described above, even when the plurality of single fishes exist in a dense condition, as illustrated in FIG. 24, the echo image components of the respective single fishes which are resolved by high resolution are displayed without the above defects, and the false image which may be caused near the water bottom can be removed.

Figure 25:
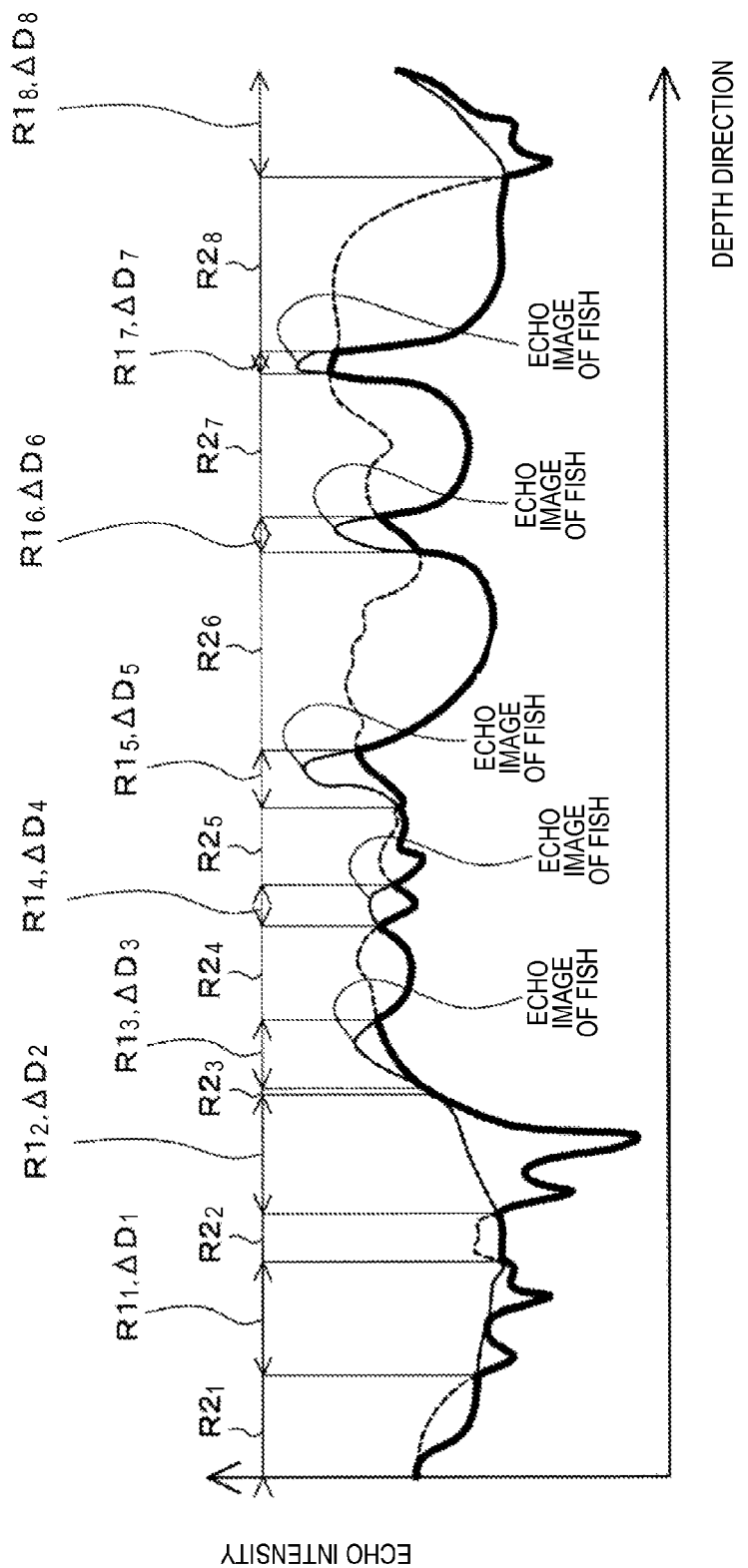
FIG. 25 is a chart in which the echo signal generated by the synthesizing module of the underwater detecting device in FIG. 1 in a certain ping is superimposed on the high resolution signal and the filtered echo signal in FIG. 20.
Figure 26:
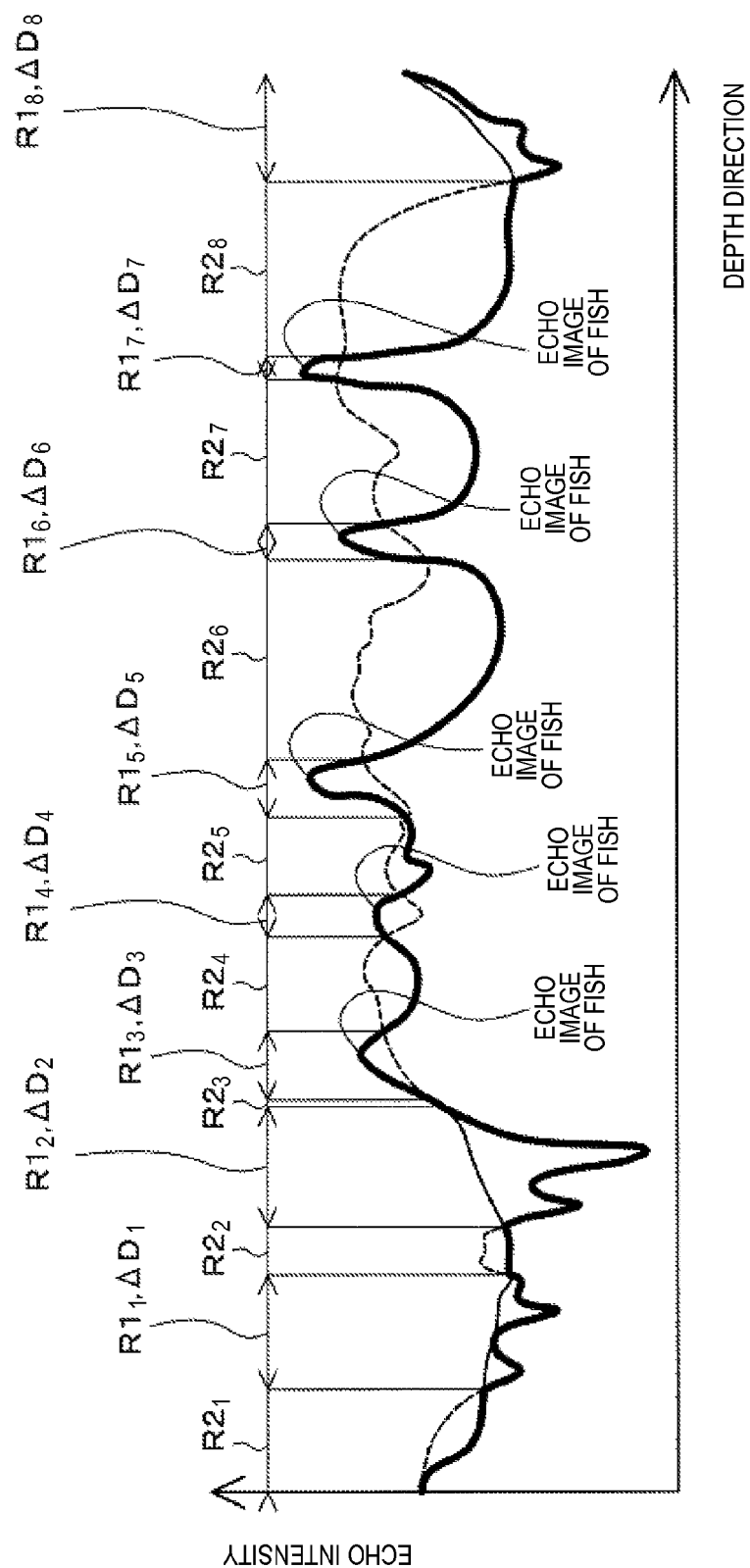
FIG. 26 is a chart in which the echo signal generated by the synthesizing module of the underwater detecting device of the seventh modification in a certain ping is superimposed on the high resolution signal and the filtered echo signal in FIG. 20.

FIG. 25 is a chart in which the echo signal generated based on the output samples by the synthesizing module 21 of the underwater detecting device 1 of the above embodiment in a certain ping is superimposed on the high resolution signal and the filtered echo signal in FIG. 20. Moreover, FIG. 26 is a chart in which the echo signal generated based on the output samples by the synthesizing module 27 of the underwater detecting device of this modification in a certain ping is superimposed on the high resolution signal and the filtered echo signal in FIG. 20.

In the case of the underwater detecting device 1 of the above embodiment, since the sample with lower echo intensity between the first and second samples is selected (waveform indicated by the thick line in FIG. 25), for example, when a plurality of single fishes exist in a dense condition, the following situation may occur. Specifically, in a part of the filtered echo signal generated based on the second samples corresponding to a depth range where the single fishes are densely concentrated (a range from $R1_3$ to about $R1_7$ in FIG. 25), the echo intensity of the echo signal may be lower than parts of the high resolution signal generated based on the first samples and caused by single fishes, respectively ($R1_3$, $R1_4$, $R1_5$, $R1_6$ and $R1_7$ in FIG. 25). Thus, with the underwater detecting device 1, sharp peaks caused by single fishes are clipped as illustrated in FIG. 25.

On the other hand, with the synthesizing module 27 of this modification, one of the corresponding first and second samples is selected based on the comparison of the intensity of the first sample with the intensity of the second sample. Thus, it can be avoided that the peaks caused by the single fishes are clipped.

Specifically, with the synthesizing module 27 of this modification, as described above, the first sample is selected in each zone where the depth range width $\Delta D_m$ is comparatively narrow among the plurality of first zones (zones where the intensity of the first sample is higher than that of the second sample). As illustrated in FIG. 26, in the high resolution signal generated based on the first samples, since each part caused by a single fish forms a comparatively sharp peak waveform ($R1_4$, $R1_5$, $R1_6$ and $R1_7$ in FIG. 26), the depth range width $\Delta D_m$ of the first zone tends to become narrow. Thus, in the zone where the depth range width $\Delta D_m$ is comparatively narrow, by selecting the first sample, it can suitably be avoided that the sharp peaks caused by the single fishes are clipped.

Further, the processings at S14 and S16 described above are performed by the synthesizing module 27 of this modification. Specifically, among the plurality of first zones, the first sample is selected within each first zone within which the first sample with the highest intensity is not on the boundary with the second zone adjacent thereto and the maximum value among the ratios between the intensities of the corresponding first and second samples is the threshold Thr2 or lower.

When the first sample with the highest intensity is not on the boundary described above, there is a possibility that a peak caused by a single fish exists within the first zone including the first sample. Therefore, such first zones become target zones where the first sample may be selected. Further, the first sample is selected within each first zone where the maximum value among the ratios between the intensities of the first and second samples is the threshold Thr2 or lower among these target zones. Within a range where a plurality of single fishes densely concentrate, although the echoes caused by the plurality of single fishes interfere to cancel or enhance each other, the influence thereof is about twice the level of the echo intensity caused by each single fish at most. In other words, when the ratio between the intensities of the first and second samples is extremely large, the first sample can be considered as not corresponding to the echo caused by the single fish. Therefore, by selecting the first sample within each first zone where the maximum value among the ratios between the intensities of the first and second samples is the threshold Thr2 or lower among the target zones described above, among the peaks caused by the single fishes, it can be avoided that a peak (e.g., the high resolution signal within the first zone $R1_3$ in FIG. 26) that is not significantly sharp is clipped.

As described above, with the underwater detecting device 1 of the above embodiment, when the single fishes exist in a dense condition, the peaks of the single fishes resolved by high resolution are clipped, causing deterioration in the visibility thereof in the echo image (see FIGS. 23 and 25). On the other hand, with the underwater detecting device of this modification, the peaks of the single fishes resolved by high resolution are displayed in the echo image without defect (see FIGS. 24 and 26). Therefore, with the underwater detecting device of this modification, even in the state where the target objects exist in a dense condition, the high resolution of the target objects can be maintained and, similar to the above embodiment, the false image which is caused near the water bottom can be reduced.

Note that, in this modification, the processings from S14 to S18 in FIG. 19 may be omitted. In this case, in the echo signal caused by the target objects, although the echo having a peak in a wide depth range width is clipped, the echo having a peak in a narrow depth range width can, similar to the case described above, be avoided from being clipped. Moreover, S12 and S13 in FIG. 19 may be omitted in this modification.

Furthermore, in this modification, the example of applying the signal processor to the underwater detecting device is described; however, without limiting to this, it is also applicable to a radar, a sonar, etc.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A signal processor for processing a target echo signal obtained based on a reflection wave caused by a reflection of a transmission wave on a target object, comprising:
processing circuitry configured to:
generate a filtered echo signal by extracting echo signal components within a predetermined frequency band from the target echo signal;
generate a high resolution signal based on the target echo signal, the high resolution signal having higher resolution than the filtered echo signal;
partition a distance range into a first zone where an intensity of a first sample sampled from the high resolution signal is the same as or higher than an intensity of a second sample sampled from the filtered echo signal, said first and second samples being corresponding samples, and a second zone where the intensity of the first sample is lower than the intensity of the second sample, said distance range corresponding to a time length from transmission of the transmission wave until reception of the reflection wave; and
synthesize the filtered echo signal with the high resolution signal in each of the first and second zones and generate an echo image from the synthesized filtered echo signal and high resolution signal in each of the first and second zones, wherein the generated echo image comprises reduced false images while maintaining resolution of the echo image generated, in order to improve target detection images.

2. The signal processor of claim 1, wherein the processing circuitry synthesizes the filtered echo signal with the high resolution signal based on an intensity of the filtered echo signal and an intensity of the high resolution signal.

3. The signal processor of claim 2, wherein the processing circuitry synthesizes the filtered echo signal with the high resolution signal based on the intensity of the first sample and the intensity of the second sample.

4. The signal processor of claim 3, wherein the processing circuitry synthesizes the filtered echo signal with the high resolution signal by selecting a sample with a lowest intensity between the first and second samples.

5. The signal processor of claim 3, wherein the processing circuitry synthesizes the filtered echo signal with the high resolution signal by adding a value obtained by multiplying the first sample by a first coefficient to a value obtained by multiplying the second sample by a second coefficient.

6. The signal processor of claim 3, wherein the processing circuitry selects one of the first sample and the second sample based on a comparison between the intensities of the first and second samples.

7. The signal processor of claim 6, wherein
the processing circuitry selects among a plurality of said first zones the first sample for a first zone having a length smaller than a predetermined threshold.

8. The signal processor of claim 6, wherein
the processing circuitry selects among a plurality of said first zones the first sample for a first zone when a first sample with a highest intensity among first samples within said first zone is at a position other than at a boundary of said first zone with the second zone adjacent thereto and when a maximum value among ratios between first and second corresponding samples within said first zone is lower than a predetermined threshold.

9. The signal processor of claim 1, wherein the processing circuitry is further configured to:
perform inverse filtering of the target echo signal; and
calculate an intensity spectrum of the inverse-filtered target echo signal.

10. The signal processor of claim 1, wherein the processing circuitry is further configured to perform pulse compression of the target echo signal.

11. An underwater detecting device, comprising:
a receiver configured to receive a target echo signal to be processed, the target echo signal being caused by an acoustic wave transmitted underwater;
the signal processor described in claim 1, configured to process the target echo signal received by the receiver; and
a display unit configured to display a synthesized signal generated by the signal processor.

12. An underwater detecting device, comprising:
a receiver configured to receive a target echo signal to be processed, the target echo signal being caused by an acoustic wave transmitted underwater;
a signal processor including processing circuitry configured to process the target echo signal received by the receiver; and
a display unit configured to display a synthesized signal, wherein the processing circuitry of the signal processor is configured to:
generate a filtered echo signal by extracting echo signal components within a predetermined frequency band from the target echo signal;
generate a high resolution signal based on the target echo signal, the high resolution signal having higher resolution than the filtered echo signal;
synthesize the filtered echo signal with the high resolution signal and generate the synthesized signal;

detect a depth position of a water bottom; and
specify a target range within which the processing circuitry synthesizes the filtered echo signal with the high resolution signal, the target range being a predetermined depth range including the depth position of the water bottom and generate an echo image from the synthesized filtered echo signal and high resolution signal in the target range, wherein the generated echo image comprises reduced false images while maintaining resolution of the echo image generated, in order to improve underwater images.

13. A radar apparatus, comprising:
an antenna configured to receive a target echo signal to be processed;
the signal processor described in claim 1, configured to process the target echo signal received by the antenna; and
a display unit configured to display a synthesized signal generated by the signal processor.

14. A method of processing a target echo signal obtained based on a reflection wave caused by a reflection of a transmission wave on a target object, the method comprising:
generating a filtered echo signal by extracting echo signal components within a predetermined frequency band from the target echo signal;
generating a high resolution signal based on the target echo signal, the high resolution signal having higher resolution than the filtered echo signal;
partitioning a distance range into a first zone where an intensity of a first sample sampled from the high resolution signal is the same as or higher than an intensity of a second sample sampled from the filtered echo signal, said first and second samples being corresponding samples, and a second zone where the intensity of the first sample is lower than the intensity of the second sample, said distance range corresponding to a time length from transmission of the transmission wave until reception of the reflection wave; and
synthesizing the filtered echo signal with the high resolution signal in each of the first and second zones and generating an echo image from the synthesized filtered echo signal and high resolution signal in each of the first and second zones, wherein the generated echo image comprises reduced false images while maintaining resolution of the echo image generated, in order to improve target detection images.

* * * * *